United States Patent
Oberoi et al.

(10) Patent No.: US 10,792,728 B2
(45) Date of Patent: Oct. 6, 2020

(54) TWO-STAGE FASTENER INSTALLATION

(71) Applicant: The Boeing Company, Chicago, IL (US)

(72) Inventors: Harinder S. Oberoi, Snohomish, WA (US); Melissa Ann Findlay, Snohomish, WA (US); Branko Sarh, Huntington Beach, CA (US); Alan S. Draper, Everett, WA (US); Jorge Alberto Arriago, Kirkland, WA (US); Jeffrey Lawrence Miller, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/928,084

(22) Filed: Mar. 21, 2018

(65) Prior Publication Data

US 2018/0207712 A1 Jul. 26, 2018

Related U.S. Application Data

(62) Division of application No. 14/559,483, filed on Dec. 3, 2014, now Pat. No. 9,937,549.

(Continued)

(51) Int. Cl.
*B21J 15/28* (2006.01)
*B64F 5/10* (2017.01)
(Continued)

(52) U.S. Cl.
CPC ............ *B21J 15/28* (2013.01); *B21J 15/02* (2013.01); *B21J 15/10* (2013.01); *B21J 15/142* (2013.01);
(Continued)

(58) Field of Classification Search
CPC . B21J 15/28; B21J 15/40; B21J 15/142; B21J 15/10; B21J 15/02; B21J 15/32;
(Continued)

(56) References Cited

U.S. PATENT DOCUMENTS 1,128,634 A 2/1915 Talbot
1,533,099 A 4/1925 Carroll
(Continued)

FOREIGN PATENT DOCUMENTS

CN 1252754 A 5/2000
CN 2779207 Y 5/2006
(Continued)

OTHER PUBLICATIONS

Chinese National Intellectual Property Administration First Notification of Office Action with English Translation, dated Oct. 26, 2018, regarding Application No. 201510394571.2, 13 pages.
(Continued)

*Primary Examiner* — Jason L Vaughan
*Assistant Examiner* — Amanda Kreiling
(74) *Attorney, Agent, or Firm* — Yee & Associates, P.C.

(57) ABSTRACT

A method and apparatus for installing a fastener. A reactive structural force is generated in a first direction during installation of the fastener. A new reactive structural force is generated in a second direction opposite to the first direction during the installation of the fastener.

20 Claims, 16 Drawing Sheets

Related U.S. Application Data

(60) Provisional application No. 62/022,641, filed on Jul. 9, 2014.

(51) Int. Cl.

| | | |
|---|---|---|
| *B21J 15/02* | (2006.01) | |
| *B21J 15/10* | (2006.01) | |
| *B21J 15/14* | (2006.01) | |
| *B60G 3/14* | (2006.01) | |
| *B25J 5/00* | (2006.01) | |
| *B25J 9/16* | (2006.01) | |
| *B25J 11/00* | (2006.01) | |
| *F16B 19/06* | (2006.01) | |
| *B23P 19/10* | (2006.01) | |
| *B60G 7/00* | (2006.01) | |
| *B21J 15/32* | (2006.01) | |
| *B21J 15/40* | (2006.01) | |
| *G05B 19/418* | (2006.01) | |
| *B25B 5/16* | (2006.01) | |
| *B29C 39/12* | (2006.01) | |
| *B29C 39/22* | (2006.01) | |
| *B64C 1/06* | (2006.01) | |
| *G05D 1/00* | (2006.01) | |
| *G05D 3/12* | (2006.01) | |
| *B29C 45/14* | (2006.01) | |
| *B29C 39/02* | (2006.01) | |
| *B29C 39/10* | (2006.01) | |
| *B64F 5/50* | (2017.01) | |
| *B23P 21/00* | (2006.01) | |
| *B29L 31/00* | (2006.01) | |
| *B60P 3/025* | (2006.01) | |

(52) U.S. Cl.
CPC ............ *B21J 15/32* (2013.01); *B21J 15/40* (2013.01); *B23P 19/10* (2013.01); *B25B 5/163* (2013.01); *B25J 5/007* (2013.01); *B25J 9/1682* (2013.01); *B25J 9/1687* (2013.01); *B25J 9/1697* (2013.01); *B25J 11/005* (2013.01); *B25J 11/007* (2013.01); *B29C 39/026* (2013.01); *B29C 39/10* (2013.01); *B29C 39/123* (2013.01); *B29C 39/22* (2013.01); *B29C 45/14336* (2013.01); *B60G 3/145* (2013.01); *B60G 7/001* (2013.01); *B60G 7/008* (2013.01); *B64C 1/06* (2013.01); *B64F 5/10* (2017.01); *B64F 5/50* (2017.01); *F16B 19/06* (2013.01); *G05B 19/41805* (2013.01); *G05D 1/0088* (2013.01); *G05D 3/12* (2013.01); *B23P 21/002* (2013.01); *B23P 2700/00* (2013.01); *B23P 2700/01* (2013.01); *B29C 2045/14368* (2013.01); *B29C 2793/0081* (2013.01); *B29K 2715/00* (2013.01); *B29L 2031/748* (2013.01); *B60G 2204/143* (2013.01); *B60G 2204/418* (2013.01); *B60G 2206/8207* (2013.01); *B60G 2300/60* (2013.01); *B60P 3/025* (2013.01); *G05B 2219/45071* (2013.01); *Y02P 90/86* (2015.11); *Y10S 901/01* (2013.01); *Y10S 901/02* (2013.01); *Y10S 901/41* (2013.01)

(58) Field of Classification Search
CPC ......... Y10T 29/49943; Y10T 29/49956; Y10T 29/5118; Y10T 29/5377
See application file for complete search history.

(56) References Cited

U.S. PATENT DOCUMENTS

| | | | |
|---|---|---|---|
| 2,391,510 A | 12/1945 | Pioch et al. | |
| 2,505,245 A | 4/1950 | Hollerith | |
| 2,712,874 A | 7/1955 | Murray | |
| 2,714,321 A | 8/1955 | Roy | |
| 2,896,909 A | 7/1959 | Taylor | |
| 3,253,842 A | 5/1966 | Rabe | |
| 3,348,572 A | 10/1967 | Hall | |
| 3,355,346 A | 11/1967 | Black et al. | |
| 3,609,851 A * | 10/1971 | McMaster | B21J 15/02 29/243.54 |
| 3,747,467 A | 7/1973 | Rosman | |
| 3,774,636 A | 11/1973 | Arita | |
| 3,865,203 A | 2/1975 | Hibma | |
| 3,934,330 A | 1/1976 | Briles | |
| 3,952,401 A * | 4/1976 | Wagner | B21J 15/02 29/524.1 |
| 4,172,591 A | 10/1979 | Craig | |
| 4,310,958 A | 1/1982 | Balaud et al. | |
| 4,424,741 A | 1/1984 | Moldestad | |
| 4,440,265 A | 4/1984 | Spagnoli | |
| 4,461,455 A | 7/1984 | Mills et al. | |
| 4,575,934 A | 3/1986 | Kitmura et al. | |
| 4,599,033 A | 7/1986 | Raz | |
| 4,685,368 A | 8/1987 | Gardener | |
| 4,714,339 A | 12/1987 | Lau et al. | |
| 4,740,025 A | 4/1988 | Nelson | |
| 4,798,371 A | 1/1989 | Wallisser | |
| 4,815,193 A | 3/1989 | Gutnik | |
| 4,864,702 A | 9/1989 | Speller et al. | |
| 4,885,836 A * | 12/1989 | Bonomi | B21J 15/10 29/524.1 |
| 4,943,202 A | 7/1990 | Galloway | |
| 4,995,148 A * | 2/1991 | Bonomi | B21J 15/10 29/26 A |
| 5,005,912 A | 4/1991 | Pipes | |
| 5,050,284 A | 9/1991 | Howard et al. | |
| 5,082,411 A | 1/1992 | Auriol et al. | |
| 5,145,276 A | 9/1992 | Demange | |
| 5,163,793 A | 11/1992 | Martinez | |
| 5,248,341 A | 9/1993 | Berry et al. | |
| 5,408,219 A | 4/1995 | Newman et al. | |
| 5,423,396 A | 6/1995 | Fahrion | |
| 5,477,597 A | 12/1995 | Catania et al. | |
| 5,795,078 A | 8/1998 | Li | |
| 5,857,713 A | 1/1999 | Horimoto | |
| 5,896,637 A | 2/1999 | Sarh | |
| 5,903,459 A | 11/1999 | Greenwood et al. | |
| 6,014,802 A | 1/2000 | Guerin | |
| 6,030,244 A | 2/2000 | Buckheit et al. | |
| 6,098,260 A | 8/2000 | Sarh | |
| 6,108,896 A | 8/2000 | Gignac et al. | |
| 6,113,343 A | 9/2000 | Goldenberg et al. | |
| 6,158,666 A | 12/2000 | Banks et al. | |
| 6,282,036 B1 | 8/2001 | Woytassek | |
| 6,295,710 B1 | 10/2001 | Roberts et al. | |
| 6,357,194 B1 | 3/2002 | Jones | |
| 6,415,476 B1 | 7/2002 | McCoy | |
| 6,447,073 B1 | 9/2002 | Goettker | |
| 6,470,820 B1 | 10/2002 | Wilkins | |
| 6,481,096 B2 | 11/2002 | Lehmker et al. | |
| 6,505,393 B2 | 1/2003 | Stoewer et al. | |
| 6,513,231 B1 | 2/2003 | Hafenrichter et al. | |
| 6,575,443 B2 | 6/2003 | Kick | |
| 6,691,392 B2 | 2/2004 | Savoy et al. | |
| 7,111,854 B1 | 9/2006 | Tuthill et al. | |
| 7,237,789 B1 | 7/2007 | Herman | |
| 7,344,109 B1 | 3/2008 | Rezai | |
| 7,402,009 B2 | 7/2008 | Hamann et al. | |
| 7,416,363 B2 | 8/2008 | Kozhuev | |
| 7,421,886 B1 | 9/2008 | Fox et al. | |
| 7,527,759 B2 | 5/2009 | Lee et al. | |
| 7,530,607 B2 | 5/2009 | Luft | |
| 7,686,287 B2 | 3/2010 | Dixon et al. | |
| RE41,821 E | 10/2010 | Ross et al. | |
| 7,805,829 B2 | 10/2010 | Herrmann et al. | |

(56) References Cited

U.S. PATENT DOCUMENTS

| | | |
|---|---|---|
| 7,940,685 B1 | 5/2011 | Breslau et al. |
| 7,966,729 B2 | 6/2011 | Frauen et al. |
| 8,266,778 B2 | 9/2012 | Neuhaus et al. |
| 8,602,713 B1 | 12/2013 | Davis et al. |
| 8,634,950 B2 | 1/2014 | Simonelli et al. |
| 8,989,053 B1 | 3/2015 | Skaaksrud et al. |
| 9,014,836 B2 | 4/2015 | Stone et al. |
| 9,063,525 B2 | 6/2015 | Sanders et al. |
| 9,096,331 B2 | 8/2015 | Gehlsen |
| 9,309,008 B2 | 4/2016 | Boulanger et al. |
| 9,315,137 B1 | 4/2016 | Davis et al. |
| 9,327,751 B2 | 5/2016 | Nou et al. |
| 9,505,051 B2 | 11/2016 | Oberoi et al. |
| 9,751,435 B1 | 9/2017 | Davis et al. |
| 9,782,822 B2 | 10/2017 | Oberoi et al. |
| 9,895,741 B2 | 2/2018 | Oberoi et al. |
| 9,937,549 B2 | 4/2018 | Oberoi et al. |
| 2001/0054228 A1 | 12/2001 | Lehmker et al. |
| 2002/0087587 A1 | 7/2002 | Vos et al. |
| 2002/0092149 A1 | 7/2002 | Wolf et al. |
| 2002/0124377 A1 | 9/2002 | Nakamura |
| 2002/0170160 A1 | 11/2002 | Savoy et al. |
| 2003/0009867 A1 | 1/2003 | Whiten et al. |
| 2003/0023540 A2 | 1/2003 | Johnson et al. |
| 2003/0229900 A1 | 12/2003 | Reisman |
| 2004/0022379 A1 | 2/2004 | Klos et al. |
| 2004/0110483 A1 | 6/2004 | Mollenkopf |
| 2004/0113756 A1 | 6/2004 | Mollenkopf |
| 2004/0113757 A1 | 6/2004 | White et al. |
| 2004/0135676 A1 | 7/2004 | Berkman et al. |
| 2004/0267254 A1 | 12/2004 | Manzo et al. |
| 2005/0023052 A1 | 2/2005 | Beck et al. |
| 2005/0041048 A1 | 2/2005 | Hillman et al. |
| 2005/0275181 A1 | 12/2005 | MacIsaac |
| 2006/0032702 A1 | 2/2006 | Linsmeier et al. |
| 2006/0117547 A1 | 6/2006 | Ffield et al. |
| 2006/0118235 A1 | 6/2006 | Lum et al. |
| 2006/0167587 A1 | 7/2006 | Read |
| 2006/0171776 A1 | 8/2006 | Luft |
| 2006/0218780 A1 | 10/2006 | Lewis et al. |
| 2006/0284047 A1 | 12/2006 | Spishak et al. |
| 2007/0001432 A1 | 1/2007 | Thurm |
| 2007/0001868 A1 | 1/2007 | Hillan |
| 2007/0036627 A1 | 2/2007 | Wright et al. |
| 2007/0051852 A1 | 3/2007 | McCoskey et al. |
| 2007/0061811 A1 | 3/2007 | Rumelhart et al. |
| 2007/0080001 A1 | 4/2007 | Beck et al. |
| 2007/0143398 A1 | 6/2007 | Graham |
| 2007/0200379 A1 | 8/2007 | Key et al. |
| 2007/0220341 A1 | 9/2007 | Apostoloui et al. |
| 2007/0266423 A1 | 11/2007 | Tehee |
| 2007/0276538 A1 | 11/2007 | Kjellsson |
| 2008/0087783 A1 | 4/2008 | Istas et al. |
| 2008/0099612 A1 | 5/2008 | Plude et al. |
| 2008/0113557 A1 | 5/2008 | Cox et al. |
| 2008/0160253 A1 | 7/2008 | Liu et al. |
| 2008/0162956 A1 | 7/2008 | Bozek et al. |
| 2008/0162958 A1 | 7/2008 | Bozek et al. |
| 2008/0178537 A1 | 7/2008 | Spangler et al. |
| 2008/0205763 A1 | 8/2008 | Marsh et al. |
| 2008/0250626 A1 | 10/2008 | Frankenberger et al. |
| 2008/0255899 A1 | 10/2008 | McConnell et al. |
| 2008/0256776 A1 | 10/2008 | Neuhaus et al. |
| 2008/0307630 A1 | 12/2008 | Hasegawa et al. |
| 2009/0022556 A1 | 1/2009 | Clark |
| 2009/0044655 A1 | 2/2009 | DeLouis et al. |
| 2009/0067973 A1 | 3/2009 | Eliuk et al. |
| 2009/0083589 A1 | 3/2009 | Fulton et al. |
| 2009/0100096 A1 | 4/2009 | Erlichson et al. |
| 2009/0139375 A1 | 6/2009 | Hathaway |
| 2009/0313363 A1 | 12/2009 | Parsons et al. |
| 2010/0031509 A1 | 2/2010 | Frauen et al. |
| 2010/0077810 A1 | 4/2010 | De Franceschi et al. |
| 2010/0156632 A1 | 6/2010 | Hyland et al. |
| 2010/0235037 A1 | 6/2010 | Vian et al. |
| 2010/0259931 A1 | 10/2010 | Chemel et al. |
| 2010/0264846 A1 | 10/2010 | Chemel et al. |
| 2010/0270933 A1 | 10/2010 | Chemel et al. |
| 2010/0295473 A1 | 11/2010 | Chemel et al. |
| 2010/0295474 A1 | 11/2010 | Chemel et al. |
| 2010/0295475 A1 | 11/2010 | Chemel et al. |
| 2010/0295482 A1 | 11/2010 | Chemel et al. |
| 2010/0295672 A1 | 11/2010 | Hyland et al. |
| 2010/0301768 A1 | 12/2010 | Chemel et al. |
| 2010/0301769 A1 | 12/2010 | Chemel et al. |
| 2010/0301770 A1 | 12/2010 | Chemel et al. |
| 2010/0301771 A1 | 12/2010 | Chemel et al. |
| 2010/0301774 A1 | 12/2010 | Chemel et al. |
| 2010/0307279 A1 | 12/2010 | Campagna et al. |
| 2011/0001436 A1 | 1/2011 | Chemel et al. |
| 2011/0001438 A1 | 1/2011 | Chemel et al. |
| 2011/0010007 A1 | 1/2011 | Sarh et al. |
| 2011/0046775 A1 | 2/2011 | Bailey et al. |
| 2011/0054694 A1 | 3/2011 | Munk |
| 2011/0063417 A1 | 3/2011 | Peters et al. |
| 2011/0066297 A1 | 3/2011 | Saberi et al. |
| 2011/0101192 A1 | 5/2011 | Lee et al. |
| 2011/0138601 A1 | 6/2011 | Kilibarda |
| 2011/0189440 A1 | 8/2011 | Appleby et al. |
| 2011/0308638 A1 | 12/2011 | Hyland et al. |
| 2012/0007374 A1 | 1/2012 | Nakasugi et al. |
| 2012/0110816 A1 | 5/2012 | Groves et al. |
| 2012/0197449 A1 | 8/2012 | Sanders |
| 2012/0201999 A1 | 8/2012 | Woods et al. |
| 2012/0235579 A1 | 9/2012 | Chemel et al. |
| 2012/0240381 A1 | 9/2012 | Carey |
| 2012/0300093 A1 | 11/2012 | Laudrain et al. |
| 2013/0008977 A1 | 1/2013 | Pfrenger et al. |
| 2013/0009469 A1 | 1/2013 | Gillett |
| 2013/0035783 A1 | 2/2013 | Scheuerman et al. |
| 2013/0152397 A1 | 6/2013 | Oberoi et al. |
| 2013/0158697 A1 | 6/2013 | Stone et al. |
| 2013/0167610 A1 | 7/2013 | Sarh et al. |
| 2013/0176141 A1 | 7/2013 | LaFrance et al. |
| 2013/0185925 A1 | 7/2013 | Sarh et al. |
| 2013/0318767 A1 | 12/2013 | Kott |
| 2014/0096365 A1 | 4/2014 | Sarh et al. |
| 2014/0156905 A1 | 6/2014 | Butcher et al. |
| 2014/0165388 A1 | 6/2014 | Kim et al. |
| 2014/0223490 A1 | 8/2014 | Pan et al. |
| 2014/0292538 A1 | 10/2014 | Pathi et al. |
| 2014/0312581 A1 | 10/2014 | Anderson |
| 2014/0339262 A1 | 11/2014 | Lipski et al. |
| 2014/0353894 A1 | 12/2014 | DesJardien et al. |
| 2014/0366352 A1 | 12/2014 | Jang |
| 2015/0005939 A1 | 1/2015 | DiStefano |
| 2015/0052596 A1 | 2/2015 | Ayanam et al. |
| 2015/0060231 A1 | 3/2015 | Bosgoed |
| 2015/0082593 A1 | 3/2015 | Courtier |
| 2015/0128394 A1 | 5/2015 | Sarh et al. |
| 2015/0135206 A1 | 5/2015 | Reisman |
| 2015/0135214 A1 | 5/2015 | Riesman |
| 2015/0244306 A1 | 8/2015 | Estes |
| 2015/0306967 A1 | 10/2015 | Cohen |
| 2015/0363481 A1 | 12/2015 | Haynes |
| 2015/0375390 A1 | 12/2015 | Becroft et al. |
| 2016/0008869 A1 | 1/2016 | Oberoi et al. |
| 2016/0008934 A1 | 1/2016 | Oberoi et al. |
| 2016/0008981 A1 | 1/2016 | Oberoi et al. |
| 2016/0009155 A1 | 1/2016 | Oberoi et al. |
| 2016/0009416 A1 | 1/2016 | Oberoi et al. |
| 2016/0009417 A1 | 1/2016 | Oberoi et al. |
| 2016/0009418 A1 | 1/2016 | Oberoi et al. |
| 2016/0009419 A1 | 1/2016 | Oberoi et al. |
| 2016/0009420 A1 | 1/2016 | Oberoi et al. |
| 2016/0009421 A1 | 1/2016 | Oberoi et al. |
| 2016/0009422 A1 | 1/2016 | Oberoi et al. |
| 2016/0011593 A1 | 1/2016 | Oberoi et al. |
| 2016/0068210 A1 | 3/2016 | Sakamoto |
| 2016/0075347 A1 | 3/2016 | Thompson et al. |
| 2016/0075451 A1 | 3/2016 | Hunt et al. |
| 2016/0076879 A1 | 3/2016 | Hunt et al. |
| 2016/0087432 A1 | 3/2016 | Matan et al. |
| 2016/0130017 A1 | 5/2016 | Best et al. |

(56) References Cited

U.S. PATENT DOCUMENTS

| | | | |
|---|---|---|---|
| 2016/0163177 | A1 | 6/2016 | Klicpera |
| 2016/0185467 | A1 | 6/2016 | Lim |
| 2016/0204606 | A1 | 7/2016 | Matan et al. |
| 2016/0217093 | A1 | 7/2016 | Whittington et al. |
| 2016/0311284 | A1 | 10/2016 | Osborne et al. |
| 2016/0319855 | A1 | 11/2016 | Watanabe |
| 2016/0354883 | A1 | 12/2016 | Vogat et al. |
| 2016/0381181 | A1 | 12/2016 | Cohan |
| 2017/0015440 | A1 | 1/2017 | Hunt et al. |
| 2017/0066044 | A1 | 3/2017 | Oberoi et al. |
| 2017/0247122 | A1 | 8/2017 | Hunt et al. |
| 2017/0253167 | A1 | 9/2017 | Gill, III |
| 2018/0126447 | A1 | 5/2018 | Oberoi et al. |

FOREIGN PATENT DOCUMENTS

| | | |
|---|---|---|
| CN | 201442654 U | 4/2010 |
| CN | 101878082 A | 11/2010 |
| CN | 102001451 A | 4/2011 |
| CN | 102765489 A | 11/2012 |
| CN | 103228536 A | 7/2013 |
| CN | 103252893 A | 8/2013 |
| CN | 103303491 A | 9/2013 |
| CN | 103889664 A | 6/2014 |
| CN | 204624973 U | 9/2015 |
| CN | 105314126 A | 2/2016 |
| DE | 10134852 A1 | 8/2002 |
| DE | 102008062026 A1 | 6/2010 |
| DE | 102009018991 A1 | 11/2010 |
| DE | 102011053800 A1 | 3/2013 |
| EP | 0040222 B1 | 11/1981 |
| EP | 0466304 A1 | 1/1992 |
| EP | 1063166 A1 | 12/2000 |
| EP | 1961514 A2 | 8/2008 |
| EP | 1329270 A1 | 7/2009 |
| EP | 2166646 A1 | 2/2010 |
| EP | 2221151 A1 | 8/2010 |
| EP | 2527257 A1 | 11/2012 |
| EP | 2527527 A2 | 11/2012 |
| EP | 2604523 A2 | 6/2013 |
| EP | 2617536 A1 | 7/2013 |
| EP | 2965834 A2 | 1/2016 |
| EP | 2965871 A2 | 1/2016 |
| EP | 2965872 A2 | 1/2016 |
| FR | 2153221 A1 | 5/1973 |
| FR | 2457151 A1 | 12/1980 |
| FR | 2706369 A1 | 12/1994 |
| FR | 2841809 A1 | 1/2004 |
| GB | 2473100 A | 3/2011 |
| JP | H04502798 A | 5/1992 |
| JP | H10503144 A | 3/1998 |
| JP | 2010194710 A | 9/2010 |
| JP | 2016016509 A | 2/2016 |
| JP | 2016016861 A | 2/2016 |
| KR | 20160006627 A | 1/2016 |
| WO | WO9636461 A1 | 11/1996 |
| WO | WO2004113015 A2 | 12/2004 |
| WO | WO2014023284 A2 | 2/2014 |

OTHER PUBLICATIONS

Chinese National Intellectual Property Administration First Notification of Office Action with English Translation, dated Oct. 29, 2018, regarding Application No. 201510400460.8, 13 pages.
Canadian Intellectual Property Office Examination Search Report, dated Nov. 8, 2018, regarding Application No. 2894308, 3 pages.
European Patent Office Communication Report, dated Nov. 16, 2018, regarding Application No. 14196574.9, 7 pages.
European Patent Office Communication Report, dated Dec. 6, 2018, regarding Application No. 14196608.5, 4 pages.
Tower, "Vise," U.S. Pat. No. 530,733, patented Dec. 11, 1894, 3 pages.
Dobson, "Sheet Metal Joint," U.S. Pat. No. 819,866, patented May 8, 1906, 2 pages.
China National Intellectual Property Administration First Notification of Office Action with English Translation, dated Oct. 31, 2018, regarding Application No. 201510394115.8, 13 pages.
European Patent Office Communication Report, dated Dec. 11, 2018, regarding Application No. 14196497.3, 4 pages.
Canadian Intellectual Property Office Examination Search Report, dated Feb. 11, 2019, regarding Application No. 3004018, 8 pages.
Canadian Intellectual Property Office Examination Search Report, dated Feb. 13, 2019, regarding Application No. 3004012, 6 pages.
Japanese Patent Office Notice of Reasons for Rejection with English Translation, dated Apr. 1, 2019, regarding Application No. 2015-119175, 9 pages.
Extended European Search Report, dated Nov. 5, 2015, regarding Application No. EP14196476.7, 6 pages.
Partial European Search Report, dated Nov. 17, 2015, regarding Application No. EP14196497.3, 5 pages.
Extended European Search Report, dated Nov. 26, 2015, regarding Application No. EP14196544.2, 8 pages.
Extended European Search Report, dated Dec. 2, 2015, regarding Application No. EP14196574.9, 8 pages.
Extended European Search Report, dated Feb. 8, 2016, regarding Application No. EP14196497.3, 13 pages.
Partial European Search Report, dated Jan. 28, 2016, regarding Application No. EP14196608.5, 10 pages.
Partial European Search Report, dated Jun. 20, 2016, regarding Application No. EP14196485.8, 129 pages.
Extended European Search Report, dated Feb. 18, 2016, regarding Application No. EP14196581.4, 9 pages.
Extended European Search Report, dated May 4, 2016, regarding Application No. EP14196469.2, 8 pages.
Extended European Search Report, dated Apr. 8, 2016, regarding Application No. EP14196472.6, 6 pages.
Extended European Search Report, dated May 9, 2016, regarding Application No. EP14196474.2, 8 pages.
Extended European Search Report, dated May 10, 2016, regarding Application No. EP14196491.6, 7 pages.
Canadian Search Report, dated Jun. 1, 2016, regarding Application No. 2894206, 4 pages.
Canadian Search Report, dated Jun. 28, 2016, regarding Application No. 2895735, 4 pages.
Canadian Search Report, dated Aug. 3, 2016, regarding Application No. 2895704, 4 pages.
Canadian Search Report, dated Sep. 8, 2016, regarding Application No. 2,894,299, 5 pages.
Extended European Search Report, dated Jul. 11, 2016, regarding Application No. 14196608.5, 15 pages.
Canadian Intellectual Property Office Examination Search Report, dated Jan. 30, 2017, regarding Application No. 2,895,739, 3 pages.
Extended European Search Report, dated Mar. 15, 2017, regarding Application No. EP14196485.8, 9 pages.
Canadian Intellectual Property Office Examination Search Report, dated Feb. 23, 2017, regarding Application No. 2,896,059, 3 pages.
Canadian Intellectual Property Office Office Action, dated Apr. 10, 2017, regarding Application No. 2,895,735, 3 pages.
Canadian Intellectual Property Office Office Action, dated May 2, 2017, regarding Application No. 2,894,311, 17 pages.
Canadian Intellectual Property Office Office Action, dated Apr. 27, 2017, regarding Application No. 2,895,737, 10 pages.
Canadian Intellectual Property Office Office Action, dated Apr. 6, 2017, regarding Application No. 2,894,306, 12 pages.
Decker et al. "Dynamic Measurement of Position and Orientation of Robots", IEEE Transactions on Instrumentation and Measurement, vol. 41, No. 6, Dec. 1992, 5 pages.
Canadian Intellectual Property Office Office Action, dated May 29, 2017, regarding Application No. 2,895,704, 7 pages.
Canadian Intellectual Property Office Office Action, dated Jun. 9, 2017, regarding Application No. 2,895,824, 5 pages.
Canadian Intellectual Property Office Office Action, dated Jul. 5, 2017, regarding Application No. 2,894,299, 18 pages.
Extended European Search Report, dated Jul. 25, 2017, regarding Application No. EP17168019.2, 8 pages.

(56) References Cited

OTHER PUBLICATIONS

Canadian Intellectual Property Office, Office Action, dated Jan. 25, 2018, regarding Application No. 2,895,737, 11 pages.
Canadian Intellectual Property Office Examination Report, dated Jan. 31, 2018, regarding Application No. 2,894,308, 19 pages.
Office Action, dated Jun. 30, 2017, regarding U.S. Appl. No. 14/559,483, 42 pages.
Notice of Allowance, dated Nov. 22, 2017, regarding U.S. Appl. No. 12/559,483, 17 pages.
Canadian Office Action dated Jun. 12, 2020, regarding Application No. 3,004,040, 9 pages.

* cited by examiner

TWO-STAGE FASTENER INSTALLATION

This application is a divisional of U.S. patent application Ser. No. 14/559,483, filed Dec. 3, 2014, now U.S. Pat. No. 9,937,549, the disclosure of which is incorporated herein by reference, which claims the benefit of U.S. Provisional Patent Application Ser. No. 62/022,641, filed Jul. 9, 2014, and entitled "Automated Flexible Manufacturing System for Building a Fuselage."

CROSS-REFERENCE TO RELATED APPLICATIONS

This application is related to the following patent applications: entitled "Autonomous Flexible Manufacturing System for Building a Fuselage," Ser. No. 14/559,518, now U.S. Pat. No. 10,213,823; entitled "Mobile Platforms for Performing Operations along an Exterior of a Fuselage Assembly," Ser. No. 14/558,933, now U.S. Pat. No. 9,505,051; entitled "Mobile Platforms for Performing Operations inside a Fuselage Assembly," Ser. No. 14/559,073; entitled "Wheel Mounting System," Ser. No. 14/559,115, now U.S. Pat. No. 9,782,822; entitled "Dual-Interface Coupler," Ser. No. 14/559,153, now U.S. Pat. No. 10,525,524; entitled "Metrology-Based System for Operating a Flexible Manufacturing System," Ser. No. 14/559,855, now U.S. Pat. No. 10,046,381; entitled "Clamping Feet for an End Effector," Ser. No. 14/559,191, now U.S. Pat. No. 10,201,847; entitled "Towers for Accessing an Interior of a Fuselage Assembly," Ser. No. 14/559,234, now U.S. Pat. No. 10,406,593; entitled "Assembly Fixture for Supporting a Fuselage Assembly," Ser. No. 14/559,277; entitled "Adjustable Retaining Structure for a Cradle Fixture," Ser. No. 14/559,303; and entitled "Utility Fixture for Creating a Distributed Utility Network," Ser. No. 14/559,371, now U.S. Pat. No. 9,895,741, filed of even date herewith, each of which claims the benefit of U.S. Provisional Patent Application Ser. No. 62/022,641, filed Jul. 9, 2014 and entitled "Automated Flexible Manufacturing System for Building a Fuselage," each assigned to the same assignee, and each incorporated herein by reference in its entirety.

BACKGROUND INFORMATION

1. Field

The present disclosure relates generally to aircraft and, in particular, to building the fuselage of an aircraft. Still more particularly, the present disclosure relates to a method, apparatus, and system for performing a two-stage riveting process to install rivets for building a fuselage assembly.

2. Background

Building a fuselage may include assembling skin panels and a support structure for the fuselage. The skin panels and support structure may be joined together to form a fuselage assembly. For example, without limitation, the skin panels may have support members, such as frames and stringers, attached to the surface of the skin panels that will face the interior of the fuselage assembly. These support members may be used to form the support structure for the fuselage assembly. The skin panels may be positioned relative to each other and the support members may be tied together to form this support structure.

Fastening operations may then be performed to join the skin panels and the support members together to form the fuselage assembly. These fastening operations may include, for example, riveting operations, interference-fit bolting operations, other types of attachment operations, or some combination thereof. The fuselage assembly may need to be assembled in a manner that meets outer mold line (OML) requirements and inner mold line (IML) requirements for the fuselage assembly.

With some currently available methods for building a fuselage assembly, the fastening operations performed to assemble the skin panels and the support members together may be performed manually. For example, without limitation, a first human operator positioned at an exterior of the fuselage assembly and a second human operator positioned at an interior of the fuselage assembly may use handheld tools to perform these fastening operations. In some cases, this type of manual fastening process may be more labor-intensive, time-consuming, ergonomically challenging, or expensive than desired. Further, in some cases, rivets that are manually installed to join parts together may have less than the desired uniform interference fit across the interface between the parts.

Some current assembly methods used to build fuselages that involve manual fastening processes may not allow fuselages to be built in the desired assembly facilities or factories at desired assembly rates or desired assembly costs. In some cases, the current assembly methods and systems used to build fuselages may require that these fuselages be built in facilities or factories specifically designated and permanently configured for building fuselages. These current assembly methods and systems may be unable to accommodate different types and shapes of fuselages. For example, without limitation, large and heavy equipment needed for building fuselages may be permanently affixed to a factory and configured for use solely with fuselages of a specific type. Therefore, it would be desirable to have a method and apparatus that take into account at least some of the issues discussed above, as well as other possible issues.

SUMMARY

In one illustrative embodiment, a method for installing a fastener may be provided. A reactive structural force may be generated in a first direction during installation of the fastener. A new reactive structural force may be generated in a second direction opposite to the first direction during the installation of the fastener.

In another illustrative embodiment, an apparatus may comprise a first robotic device having a first tool, a second robotic device having a second tool, and a number of controllers that control the first robotic device and the second robotic device to perform a two-stage process for installing a fastener.

In still another illustrative embodiment, an apparatus may comprise a plurality of parts, a hole extending through the plurality of parts, and a partially formed fastener having an interference fit with at least a portion of the hole.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
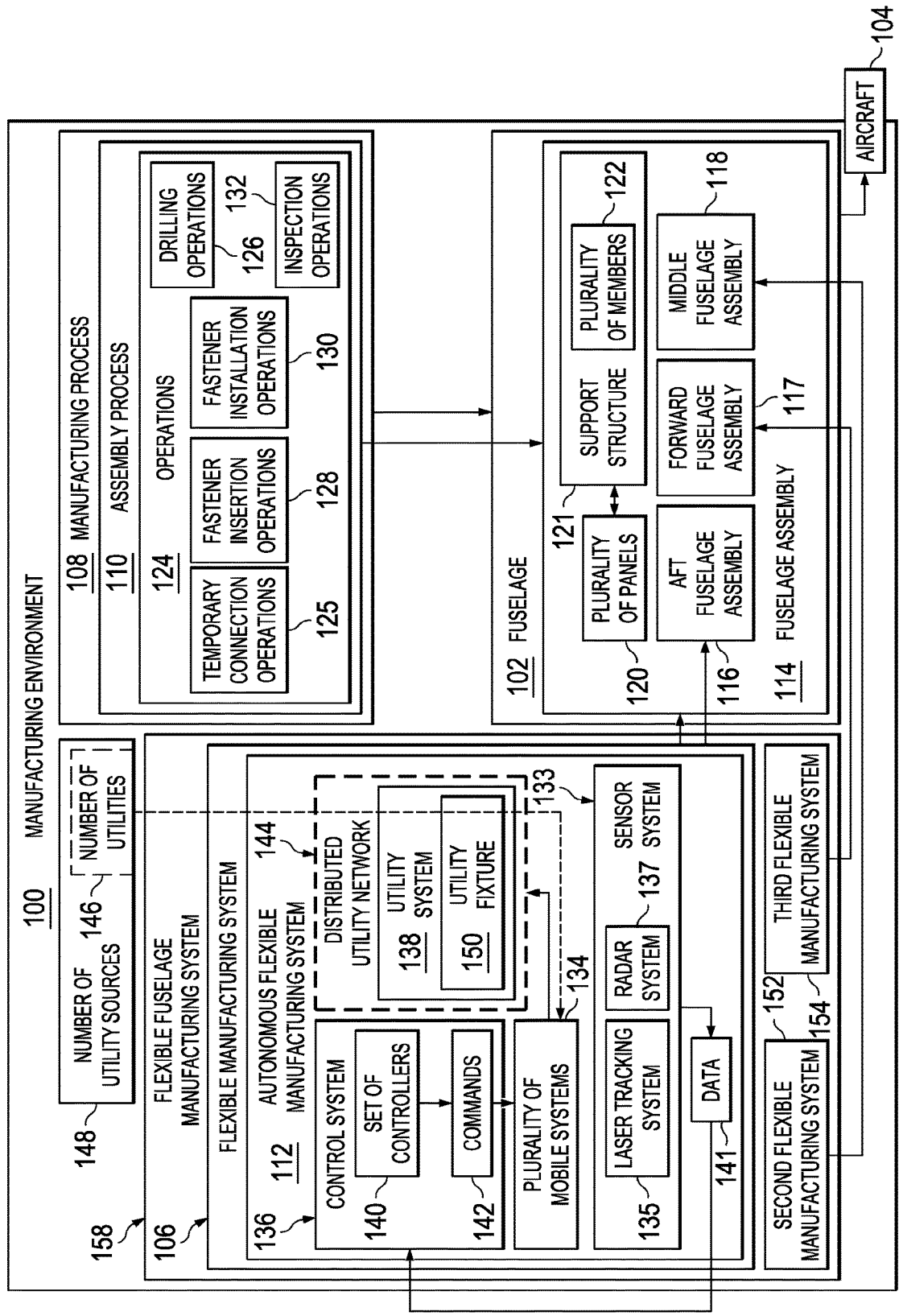
FIG. 1 is an illustration of a manufacturing environment in the form of a block diagram in accordance with an illustrative embodiment.

The illustrative embodiments recognize and take into account different considerations. For example, the illustrative embodiments recognize and take into account that it may be desirable to automate the process of building a fuselage assembly for an aircraft. Automating the process of building a fuselage assembly for an aircraft may improve build efficiency, improve build quality, and reduce costs associated with building the fuselage assembly. The illustrative embodiments also recognize and take into account that automating the process of building a fuselage assembly may improve the accuracy and precision with which assembly operations are performed, thereby ensuring improved compliance with outer mold line (OML) requirements and inner mold line (IML) requirements for the fuselage assembly.

Further, the illustrative embodiments recognize and take into account that automating the process used to build a fuselage assembly for an aircraft may significantly reduce the amount of time needed for the build cycle. For example, without limitation, automating fastening operations may reduce and, in some cases, eliminate, the need for human operators to perform these fastening operations as well as other types of assembly operations.

Further, this type of automation of the process for building a fuselage assembly for an aircraft may be less labor-intensive, time-consuming, ergonomically challenging, and expensive than performing this process primarily manually. Reduced manual labor may have a desired benefit for the human laborer. Additionally, automating the fuselage assembly process may allow fuselage assemblies to be built in desired assembly facilities and factories at desired assembly rates and desired assembly costs.

The illustrative embodiments also recognize and take into account that it may be desirable to use equipment that can be autonomously driven and operated to automate the process of building a fuselage assembly. In particular, it may be desirable to have an autonomous flexible manufacturing system comprised of mobile systems that may be autonomously driven across a factory floor, autonomously positioned relative to the factory floor as needed for building the fuselage assembly, autonomously operated to build the fuselage assembly, and then autonomously driven away when building of the fuselage assembly has been completed.

As used herein, performing any operation, action, or step autonomously may mean performing that operation substantially without any human input. For example, without limitation, a platform that may be autonomously driven is a platform that may be driven substantially independently of any human input. In this manner, an autonomously drivable platform may be a platform that is capable of driving or being driven substantially independently of human input.

Thus, the illustrative embodiments provide a method, apparatus, and system for building a fuselage assembly for an aircraft. In particular, the illustrative embodiments provide an autonomous flexible manufacturing system that automates most, if not all, of the process of building a fuselage assembly. For example, without limitation, the autonomous flexible manufacturing system may automate the process of installing fasteners to join fuselage skin panels and a fuselage support structure together to build the fuselage assembly.

However, the illustrative embodiments recognize and take into account that automating the process for building a fuselage assembly using an autonomous flexible manufacturing system may present unique technical challenges that require unique technical solutions. For example, the illustrative embodiments recognize and take into account that it may be desirable to provide utilities to all of the various systems within the autonomous flexible manufacturing system. In particular, it may be desirable to provide these utilities in a manner that will not disrupt or delay the process of building the fuselage assembly or restrict the movement of various mobile systems within the autonomous flexible manufacturing system over a factory floor.

For example, without limitation, it may be desirable to provide a set of utilities, such as power, communications, and air, to the autonomous flexible manufacturing system using an infrastructure that includes only a single direct connection to each of a set of utility sources providing the set of utilities. These direct connections may be above-ground, in-ground, or embedded. These direct connections may be established using, for example, without limitation, a utility fixture. Thus, the infrastructure may include a utility fixture that provides a direct connection to each of the set of utility sources and an assembly area with a floor space sufficiently large to allow the various systems of an autonomous flexible manufacturing system to be coupled to the utility fixture and each other in series. In this manner, the set of utilities may flow from the set of utility sources to the utility fixture and then downstream to the various systems of the autonomous flexible manufacturing system within the assembly area.

Thus, the illustrative embodiments provide a distributed utility network that may be used to provide utilities to the various systems of the autonomous flexible manufacturing system. The distributed utility network may provide these utilities in a manner that does not restrict or impede movement of the various mobile systems of the autonomous flexible manufacturing system. The different mobile systems of the autonomous flexible manufacturing system may be autonomously coupled to each other to create this distributed utility network.

Referring now to the figures and, in particular, with reference to FIGS. 1-6, illustrations of a manufacturing environment are depicted in the form of block diagrams in accordance with an illustrative embodiment. In particular, in FIGS. 1-6, a fuselage assembly, a flexible manufacturing system, the various systems within the flexible manufacturing system that may be used to build the fuselage assembly, and a distributed utility network are described.

Turning now to FIG. 1, an illustration of a manufacturing environment is depicted in the form of a block diagram in accordance with an illustrative embodiment. In this illustrative example, manufacturing environment 100 may be an example of one environment in which at least a portion of fuselage 102 may be manufactured for aircraft 104.

Manufacturing environment 100 may take a number of different forms. For example, without limitation, manufacturing environment 100 may take the form of a factory, a manufacturing facility, an outdoor factory area, an enclosed manufacturing area, an offshore platform, or some other type of manufacturing environment 100 suitable for building at least a portion of fuselage 102.

Fuselage 102 may be built using manufacturing process 108. Flexible manufacturing system 106 may be used to implement at least a portion of manufacturing process 108. In one illustrative example, manufacturing process 108 may be substantially automated using flexible manufacturing system 106. In other illustrative examples, only one or more stages of manufacturing process 108 may be substantially automated.

Flexible manufacturing system 106 may be configured to perform at least a portion of manufacturing process 108 autonomously. In this manner, flexible manufacturing system 106 may be referred to as autonomous flexible manufacturing system 112. In other illustrative examples, flexible manufacturing system 106 may be referred to as an automated flexible manufacturing system.

As depicted, manufacturing process 108 may include assembly process 110 for building fuselage assembly 114. Flexible manufacturing system 106 may be configured to perform at least a portion of assembly process 110 autonomously.

Fuselage assembly 114 may be fuselage 102 at any stage during manufacturing process 108 prior to the completion of manufacturing process 108. In some cases, fuselage assembly 114 may be used to refer to a partially assembled fuselage 102. Depending on the implementation, one or more other components may need to be attached to fuselage assembly 114 to fully complete the assembly of fuselage 102. In other cases, fuselage assembly 114 may be used to refer to the fully assembled fuselage 102. Flexible manufacturing system 106 may build fuselage assembly 114 up to the point needed to move fuselage assembly 114 to a next stage in the manufacturing process for building aircraft 104. In some cases, at least a portion of flexible manufacturing system 106 may be used at one or more later stages in the manufacturing process for building aircraft 104.

In one illustrative example, fuselage assembly 114 may be an assembly for forming a particular section of fuselage 102. As one example, fuselage assembly 114 may take the form of aft fuselage assembly 116 for forming an aft section of fuselage 102. In another example, fuselage assembly 114 may take the form of forward fuselage assembly 117 for forming a forward section of fuselage 102. In yet another example, fuselage assembly 114 may take the form of middle fuselage assembly 118 for forming a center section of fuselage 102 or some other middle section of fuselage 102 between the aft and forward sections of fuselage 102.

As depicted, fuselage assembly 114 may include plurality of panels 120 and support structure 121. Support structure 121 may be comprised of plurality of members 122. Plurality of members 122 may be used to both support plurality of panels 120 and connect plurality of panels 120 to each other. Support structure 121 may help provide strength, stiffness, and load support for fuselage assembly 114.

Plurality of members 122 may be associated with plurality of panels 120. As used herein, when one component or structure is "associated" with another component or structure, the association is a physical association in the depicted examples.

For example, a first component, such as one of plurality of members 122, may be considered to be associated with a second component, such as one of plurality of panels 120, by being at least one of secured to the second component, bonded to the second component, mounted to the second component, attached to the component, coupled to the component, welded to the second component, fastened to the second component, adhered to the second component, glued to the second component, or connected to the second component in some other suitable manner. The first component also may be connected to the second component using one or more other components. For example, the first component may be connected to the second component using a third component. Further, the first component may be considered to be associated with the second component by being formed as part of the second component, an extension of the second component, or both. In another example, the first component may be considered part of the second component by being co-cured with the second component.

As used herein, the phrase "at least one of," when used with a list of items, means different combinations of one or more of the listed items may be used and only one of the items in the list may be needed. The item may be a particular object, thing, action, process, or category. In other words, "at least one of" means any combination of items or number of items may be used from the list, but not all of the items in the list may be required.

For example, "at least one of item A, item B, and item C" or "at least one of item A, item B, or item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In these illustrative examples, a member of plurality of members 122 may be associated with at least one of plurality of panels 120 in a number of different ways. For example, without limitation, a member of plurality of members 122 may be attached directly to a single panel, attached to two or more panels, attached to another member that is directly attached to at least one panel, attached to at least one member that is directly or indirectly attached to at least one panel, or associated with at least one of plurality of panels 120 in some other way.

In one illustrative example, substantially all or all of plurality of members 122 may be associated with plurality of panels 120 prior to the beginning of assembly process 110 for building fuselage assembly 114. For example, a corresponding portion of plurality of members 122 may be associated with each panel of plurality of panels 120 prior to plurality of panels 120 being joined to each other through assembly process 110.

In another illustrative example, only a first portion of plurality of members 122 may be associated with plurality of panels 120 prior to the beginning of assembly process 110. Assembly process 110 may include attaching a remaining portion of plurality of members 122 to plurality of panels 120 for at least one of providing support to plurality of panels 120 or connecting plurality of panels 120 together. The first portion of plurality of members 122 attached to plurality of panels 120 prior to assembly process 110 and the remaining portion of plurality of members 122 attached to plurality of panels 120 during assembly process 110 may together form support structure 121.

In yet another illustrative example, all of plurality of members 122 may be associated with plurality of panels 120 during assembly process 110. For example, each of plurality of panels 120 may be "naked" without any members attached to or otherwise associated with the panel prior to assembly process 110. During assembly process 110, plurality of members 122 may then be associated with plurality of panels 120.

In this manner, support structure 121 for fuselage assembly 114 may be built up in a number of different ways. Fuselage assembly 114 comprising plurality of panels 120 and support structure 121 is described in greater detail in FIG. 2 below.

Building fuselage assembly 114 may include joining plurality of panels 120 together. Joining plurality of panels 120 may be performed in a number of different ways. Depending on the implementation, joining plurality of panels 120 together may include joining one or more of plurality of members 122 to one or more of plurality of panels 120 or to other members of plurality of members 122.

In particular, joining plurality of panels 120 may include joining at least one panel to at least one other panel, joining at least one member to at least one other member, or joining at least one member to at least one panel, or some combination thereof. As one illustrative example, joining a first panel and a second panel together may include at least one of the following: fastening the first panel directly to the second panel, joining a first member associated with the first panel to a second member associated with the second panel, joining a member associated with the first panel directly to the second panel, joining one member associated with both the first panel and the second panel to another member, joining a selected member to both the first panel and the second panel, or some other type of joining operation.

Assembly process 110 may include operations 124 that may be performed to join plurality of panels 120 together to build fuselage assembly 114. In this illustrative example, flexible manufacturing system 106 may be used to perform at least a portion of operations 124 autonomously.

Operations 124 may include, for example, but are not limited to, temporary connection operations 125, drilling operations 126, fastener insertion operations 128, fastener installation operations 130, inspection operations 132, other types of assembly operations, or some combination thereof. Temporary connection operations 125 may be performed to temporarily connect plurality of panels 120 together. For example, without limitation, temporary connection operations 125 may include temporarily tacking plurality of panels 120 together using tack fasteners.

Drilling operations 126 may include drilling holes through one or more of plurality of panels 120 and, in some cases, through one or more of plurality of members 122. Fastener insertion operations 128 may include inserting fasteners into the holes drilled by drilling operations 126.

Fastener installation operations 130 may include fully installing each of the fasteners that have been inserted into the holes. Fastener installation operations 130 may include, for example, without limitation, riveting operations, interference-fit bolting operations, other types of fastener installation operations, or some combination thereof. Inspection operations 132 may include inspecting the fully installed fasteners. Depending on the implementation, flexible manufacturing system 106 may be used to perform any number of these different types of operations 124 substantially autonomously.

As depicted, flexible manufacturing system 106 may include plurality of mobile systems 134, control system 136, and utility system 138. Each of plurality of mobile systems 134 may be a drivable mobile system. In some cases, each of plurality of mobile systems 134 may be an autonomously drivable mobile system. For example, without limitation, each of plurality of mobile systems 134 may include one or more components that may be autonomously driven within manufacturing environment 100 from one location to another location. Plurality of mobile systems 134 are described in greater detail in FIG. 3 below.

In this illustrative example, control system 136 may be used to control the operation of flexible manufacturing system 106. For example, without limitation, control system 136 may be used to control plurality of mobile systems 134. In particular, control system 136 may be used to direct the movement of each of plurality of mobile systems 134 within manufacturing environment 100. Control system 136 may be at least partially associated with plurality of mobile systems 134.

In one illustrative example, control system 136 may include set of controllers 140. As used herein, a "set of" items may include one or more items. In this manner, set of controllers 140 may include one or more controllers.

Each of set of controllers 140 may be implemented using hardware, firmware, software, or some combination thereof. In one illustrative example, set of controllers 140 may be associated with plurality of mobile systems 134. For example, without limitation, one or more of set of controllers 140 may be implemented as part of plurality of mobile systems 134. In other examples, one or more of set of controllers 140 may be implemented independently of plurality of mobile systems 134.

Set of controllers 140 may generate commands 142 to control the operation of plurality of mobile systems 134 of flexible manufacturing system 106. Set of controllers 140 may communicate with plurality of mobile systems 134 using at least one of a wireless communications link, a wired communications link, an optical communications link, or other type of communications link. In this manner, any number of different types of communications links may be used for communication with and between set of controllers 140.

In these illustrative examples, control system 136 may control the operation of plurality of mobile systems 134 using data 141 received from sensor system 133. Sensor system 133 may be comprised of any number of individual sensor systems, sensor devices, controllers, other types of components, or combination thereof. In one illustrative example, sensor system 133 may include laser tracking system 135 and radar system 137. Laser tracking system 135 may be comprised of any number of laser tracking devices, laser targets, or combination thereof. Radar system 137 may be comprised of any number of radar sensors, radar targets, or combination thereof.

Sensor system 133 may be used to coordinate the movement and operation of the various mobile systems in plurality of mobile systems 134 within manufacturing environment 100. As one illustrative example, radar system 137 may be used for macro-positioning mobile systems, systems within mobile systems, components within mobile systems, or some combination thereof. Further, laser tracking system 135 may be used for micro-positioning mobile systems, systems within mobile systems, components within mobile systems, or some combination thereof.

Plurality of mobile systems 134 may be used to form distributed utility network 144. Depending on the implementation, one or more of plurality of mobile systems 134 may form distributed utility network 144. Number of utilities 146 may flow from number of utility sources 148 to the various mobile systems of plurality of mobile systems 134 that make up distributed utility network 144.

In this illustrative example, each of number of utility sources 148 may be located with manufacturing environment 100. In other illustrative examples, one or more of number of utility sources 148 may be located outside of manufacturing environment 100. The corresponding utility provided by these one or more utility sources may then be carried into manufacturing environment 100 using, for example, without limitation, one or more utility cables.

In one illustrative example, distributed utility network 144 may allow number of utilities 146 to flow directly from number of utility sources 148 to one mobile system in plurality of mobile systems 134 over some number of utility cables. This one mobile system may then distribute number of utilities 146 to other mobile systems of plurality of mobile systems 134 such that these other mobile systems do not need to directly receive number of utilities 146 from number of utility sources 148.

As depicted, distributed utility network 144 may be formed using utility system 138. Utility system 138 may include utility fixture 150. Utility system 138 may be configured to connect to number of utility sources 148 such that number of utilities 146 may flow from number of utility sources 148 to utility fixture 150. Utility fixture 150 may be above-ground or in-ground, depending on the implementation. For example, without limitation, utility fixture 150 may be embedded in a floor within manufacturing environment 100.

Utility fixture 150 may then distribute number of utilities 146 to one or more of plurality of mobile systems 134. In particular, one autonomous coupling of one of plurality of mobile systems 134 to utility fixture 150 may be followed by any number of autonomous couplings of mobile systems to each other in series to form distributed utility network 144. Utility fixture 150 may distribute number of utilities 146 to each of plurality of mobile systems 134 downstream of utility fixture 150 in the series of autonomous couplings of the mobile systems.

Depending on the implementation, distributed utility network 144 may have a chain-like configuration or a tree-like configuration. In one illustrative example, plurality of mobile systems 134 may include mobile systems A, B, C, and D (not shown in figure) with mobile system A autonomously coupled to utility fixture 150 and mobile systems B, C, and D autonomously coupled to mobile system A and each other in series. An example of a chain-like configuration for distributed utility network 144 may include number of utilities 146 flowing from number of utility sources 148 over some number of utility cables to utility fixture 150, from utility fixture 150 to mobile system A, from mobile system A to mobile system B, from mobile system B to mobile system C, and from mobile system C to mobile system D. An example of a tree-like configuration for distributed utility network 144 may include number of utilities 146 flowing from number of utility sources 148 over some number of utility cables to utility fixture 150, from utility fixture 150 to mobile system A, from mobile system A to both mobile system B and mobile system C, and from mobile system C to mobile system D. An example of one manner in which distributed utility network 144 may be implemented using plurality of mobile systems 134 is described in greater detail in FIG. 5 below.

In some illustrative examples, multiple flexible manufacturing systems may be used to build multiple fuselage assemblies concurrently. For example, flexible manufacturing system 106 may be a first flexible manufacturing system of many flexible manufacturing systems.

In one illustrative example, flexible manufacturing system 106, second flexible manufacturing system 152, and third flexible manufacturing system 154 may be used to build aft fuselage assembly 116, middle fuselage assembly 118, and forward fuselage assembly 117, respectively. Aft fuselage assembly 116, middle fuselage assembly 118, and forward fuselage assembly 117 may then be joined together to form a fully assembled fuselage 102. In this manner, in this example, flexible manufacturing system 106, second flexible manufacturing system 152, and third flexible manufacturing system 154 may together form flexible fuselage manufacturing system 158.

Thus, any number of fuselage assemblies, such as fuselage assembly 114, may be built within manufacturing environment 100 using any number of flexible manufacturing systems implemented in a manner similar to flexible manufacturing system 106. Similarly, any number of full fuselages, such as fuselage 102, may be built within manufacturing environment 100 using any number of flexible fuselage manufacturing systems implemented in a manner similar to flexible fuselage manufacturing system 158.

Figure 2:
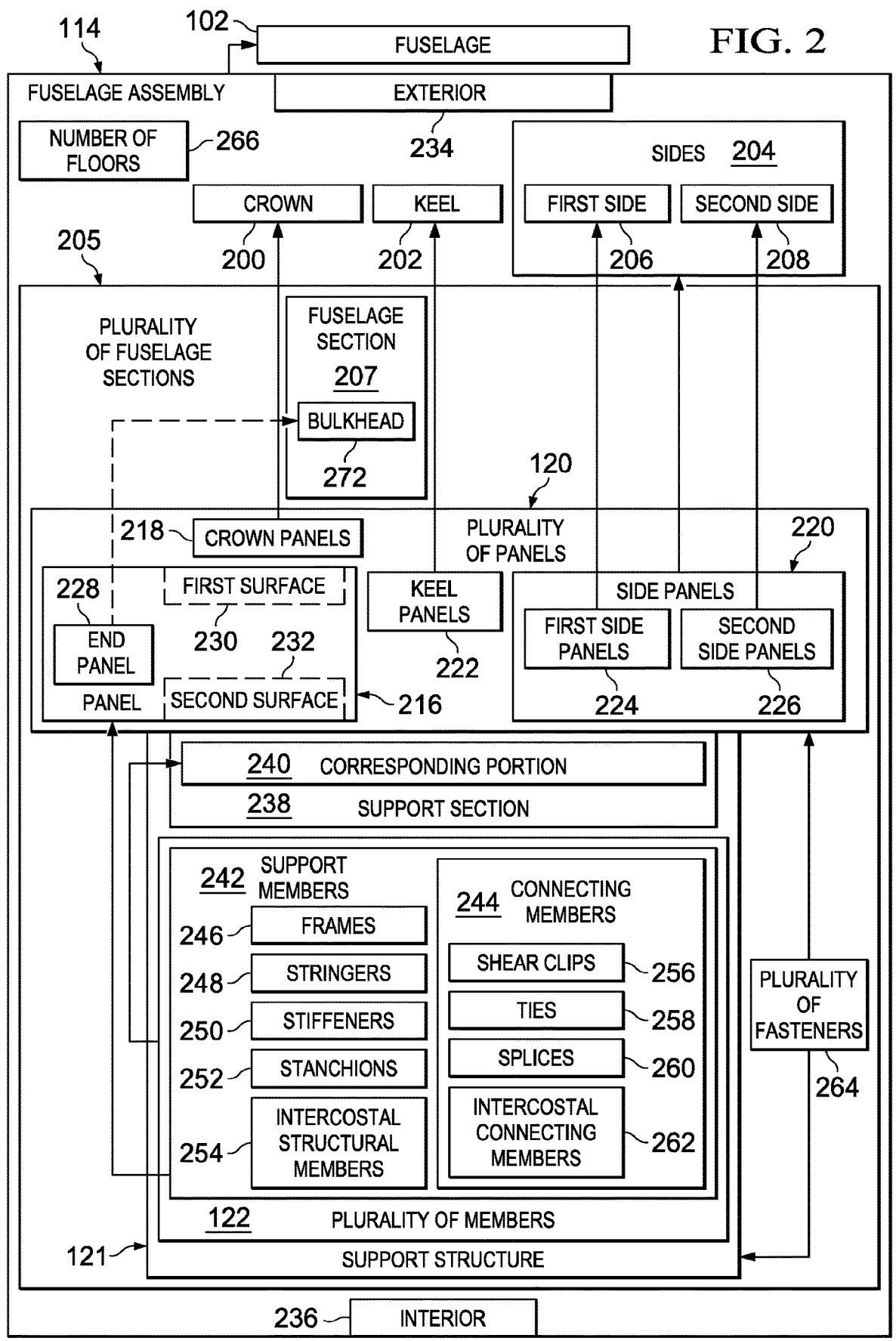
FIG. 2 is an illustration of a fuselage assembly in the form of a block diagram in accordance with an illustrative embodiment.

With reference now to FIG. 2, an illustration of fuselage assembly 114 from FIG. 1 is depicted in the form of a block diagram in accordance with an illustrative embodiment. As described above, fuselage assembly 114 may include plurality of panels 120 and support structure 121. Fuselage assembly 114 may be used to refer to any stage in the building of fuselage assembly 114. For example, fuselage assembly 114 may be used to refer to a single one of plurality of panels 120, multiple ones of plurality of panels 120 that have been or are being joined together, a partially built fuselage assembly, or a fully built fuselage assembly.

As depicted, fuselage assembly 114 may be built such that fuselage assembly 114 has plurality of fuselage sections 205. Each of plurality of fuselage sections 205 may include one or more of plurality of panels 120. In this illustrative example, each of plurality of fuselage sections 205 may take the form of a cylindrically-shaped fuselage section, a barrel-shaped fuselage section, a tapered cylindrical fuselage section, a cone-shaped fuselage section, a dome-shaped fuselage section, or a section having some other type of shape. Depending on the implementation, a fuselage section of plurality of fuselage sections 205 may have a shape that has a substantially circular cross-sectional shape, elliptical cross-sectional shape, oval cross-sectional shape, polygon with rounded corners cross-sectional shape, or otherwise closed-curve cross-sectional shape.

As one specific illustrative example, each of plurality of fuselage sections 205 may be a portion of fuselage assembly 114 defined between two radial cross-sections of fuselage assembly 114 that are taken substantially perpendicular to a center axis or longitudinal axis through fuselage assembly 114. In this manner, plurality of fuselage sections 205 may be arranged along the longitudinal axis of fuselage assembly 114. In other words, plurality of fuselage sections 205 may be arranged longitudinally.

Fuselage section 207 may be an example of one of plurality of fuselage sections 205. Fuselage section 207 may be comprised of one or more of plurality of panels 120. In one illustrative example, multiple panel sections may be arranged circumferentially around fuselage section 207 to form the skin of fuselage section 207. In some cases, multiple rows of two or more longitudinally adjacent panels may be arranged circumferentially around fuselage section 207 to form the skin of fuselage section 207.

In one illustrative example, fuselage assembly 114 may have crown 200, keel 202, and sides 204. Sides 204 may include first side 206 and second side 208.

Crown 200 may be the top portion of fuselage assembly 114. Keel 202 may be the bottom portion of fuselage assembly 114. Sides 204 of fuselage assembly 114 may be the portions of fuselage assembly 114 between crown 200 and keel 202. In one illustrative example, each of crown 200, keel 202, first side 206, and second side 208 of fuselage assembly 114 may be formed by at least a portion of at least one of plurality of panels 120. Further, a portion of each of plurality of fuselage sections 205 may form each of crown 200, keel 202, first side 206, and second side 208.

Panel 216 may be an example of one of plurality of panels 120. Panel 216 may also be referred to as a skin panel, a fuselage panel, or a fuselage skin panel, depending on the implementation. In some illustrative examples, panel 216 may take the form of a mega-panel comprised of multiple smaller panels, which may be referred to as sub-panels. A mega-panel may also be referred to as a super panel. In these illustrative examples, panel 216 may be comprised of at least one of a metal, a metal alloy, some other type of metallic material, a composite material, or some other type of material. As one illustrative example, panel 216 may be comprised of an aluminum alloy, steel, titanium, a ceramic material, a composite material, some other type of material, or some combination thereof.

When used to form keel 202 of fuselage assembly 114, panel 216 may be referred to as a keel panel or a bottom panel. When used to form one of sides 204 of fuselage assembly 114, panel 216 may be referred to as a side panel. When used to form crown 200 of fuselage assembly 114, panel 216 may be referred to as a crown panel or a top panel. As one illustrative example, plurality of panels 120 may include crown panels 218 for forming crown 200, side panels 220 for forming sides 204, and keel panels 222 for forming keel 202. Side panels 220 may include first side panels 224 for forming first side 206 and second side panels 226 for forming second side 208.

In one illustrative example, fuselage section 207 of plurality of fuselage sections 205 of fuselage assembly 114 may include one of crown panels 218, two of side panels 220, and one of keel panels 222. In another illustrative example, fuselage section 207 may form an end of fuselage assembly 114.

In some cases, fuselage section 207 may be comprised solely of a single panel, such as panel 216. For example, without limitation, panel 216 may take the form of end panel 228.

End panel 228 may be used to form one end of fuselage assembly 114. For example, when fuselage assembly 114 takes the form of aft fuselage assembly 116 in FIG. 1, end panel 228 may form the aftmost end of fuselage assembly 114. When fuselage assembly 114 takes the form of forward fuselage assembly 117 in FIG. 1, end panel 228 may form the forwardmost end of fuselage assembly 114.

In one illustrative example, end panel 228 may take the form of a cylindrically-shaped panel, a cone-shaped panel, a barrel-shaped panel, or a tapered cylindrical panel. For example, end panel 228 may be a single cylindrically-shaped panel having a substantially circular cross-sectional shape that may change in diameter with respect to a center axis for fuselage assembly 114.

In this manner, as described above, fuselage section 207 may be comprised solely of end panel 228. In some illustrative examples, fuselage section 207 may be an end fuselage section that is comprised of only a single panel, which may be end panel 228. In some cases, bulkhead 272 may be associated with end panel 228 when fuselage section 207 is an end fuselage section. Bulkhead 272, which may also be referred to as a pressure bulkhead, may be considered separate from or part of end panel 228, depending on the implementation. Bulkhead 272 may have a dome-type shape in these illustrative examples.

When fuselage assembly 114 takes the form of aft fuselage assembly 116 in FIG. 1, bulkhead 272 may be part of fuselage section 207 located at the aftmost end of aft fuselage assembly 116. When fuselage assembly 114 takes the form of forward fuselage assembly 117 in FIG. 1, bulkhead 272 may be part of fuselage section 207 located at forwardmost end of aft fuselage assembly 116. Middle fuselage assembly 118 in FIG. 1 may not include a bulkhead, such as bulkhead 272, at either end of middle fuselage assembly 118. In this manner, plurality of fuselage sections 205 may be implemented in any number of different ways.

Panel 216 may have first surface 230 and second surface 232. First surface 230 may be configured for use as an exterior-facing surface. In other words, first surface 230 may be used to form exterior 234 of fuselage assembly 114. Second surface 232 may be configured for use as an interior-facing surface. In other words, second surface 232 may be used to form interior 236 of fuselage assembly 114. Each of plurality of panels 120 may be implemented in a manner similar to panel 216.

As described earlier, support structure 121 may be associated with a corresponding one of plurality of panels 120. Support structure 121 may be comprised of plurality of members 122 that are associated with panel 216. In one illustrative example, corresponding portion 240 may be the portion of plurality of members 122 that correspond to panel 216. Corresponding portion 240 may form support section 238 corresponding to panel 216. Support section 238 may form a part of support structure 121.

Plurality of members 122 may include support members 242. Support members 242 may include, for example, without limitation, at least one of connecting members 244, frames 246, stringers 248, stiffeners 250, stanchions 252, intercostal structural members 254, or other types of structural members.

Connecting members 244 may connect other types of support members 242 together. In some cases, connecting members 244 may also connect support members 242 to plurality of panels 120. Connecting members 244 may include, for example, without limitation, shear clips 256, ties 258, splices 260, intercostal connecting members 262, other types of mechanical connecting members, or some combination thereof.

In one illustrative example, when panel 216 is comprised of multiple sub-panels, connecting members 244 may be used to, for example, without limitation, connect together complementary frames of frames 246 running in the hoopwise direction on adjacent sub-panels and complementary stringers of stringers 248 running in the longitudinal direction on adjacent sub-panels. In other illustrative examples, connecting members 244 may be used to connect together complementary frames, stringers, or other types of support members on two or more adjacent panels in plurality of panels 120. In some cases, connecting members 244 may be used to connect together complementary support members on two or more adjacent fuselage sections.

Operations 124, as described in FIG. 1, may be performed to join plurality of panels 120 together to build fuselage assembly 114. In one illustrative example, plurality of fasteners 264 may be used to join plurality of panels 120 together.

As described above, joining plurality of panels 120 together may be performed in a number of different ways. Joining plurality of panels 120 together may include at least one of joining at least one panel in plurality of panels 120 to another one of plurality of panels 120, joining at least one panel in plurality of panels 120 to at least one of plurality of members 122, joining at least one member in plurality of members 122 to another one of plurality of members 122, or some other type of joining operation. Plurality of panels 120 may be joined together such that plurality of members 122 ultimately form support structure 121 for fuselage assembly 114.

As depicted, number of floors 266 may be associated with fuselage assembly 114. In this illustrative example, number of floors 266 may be part of fuselage assembly 114. Number of floors 266 may include, for example, without limitation, at least one of a passenger floor, a cargo floor, or some other type of floor.

Figure 3:
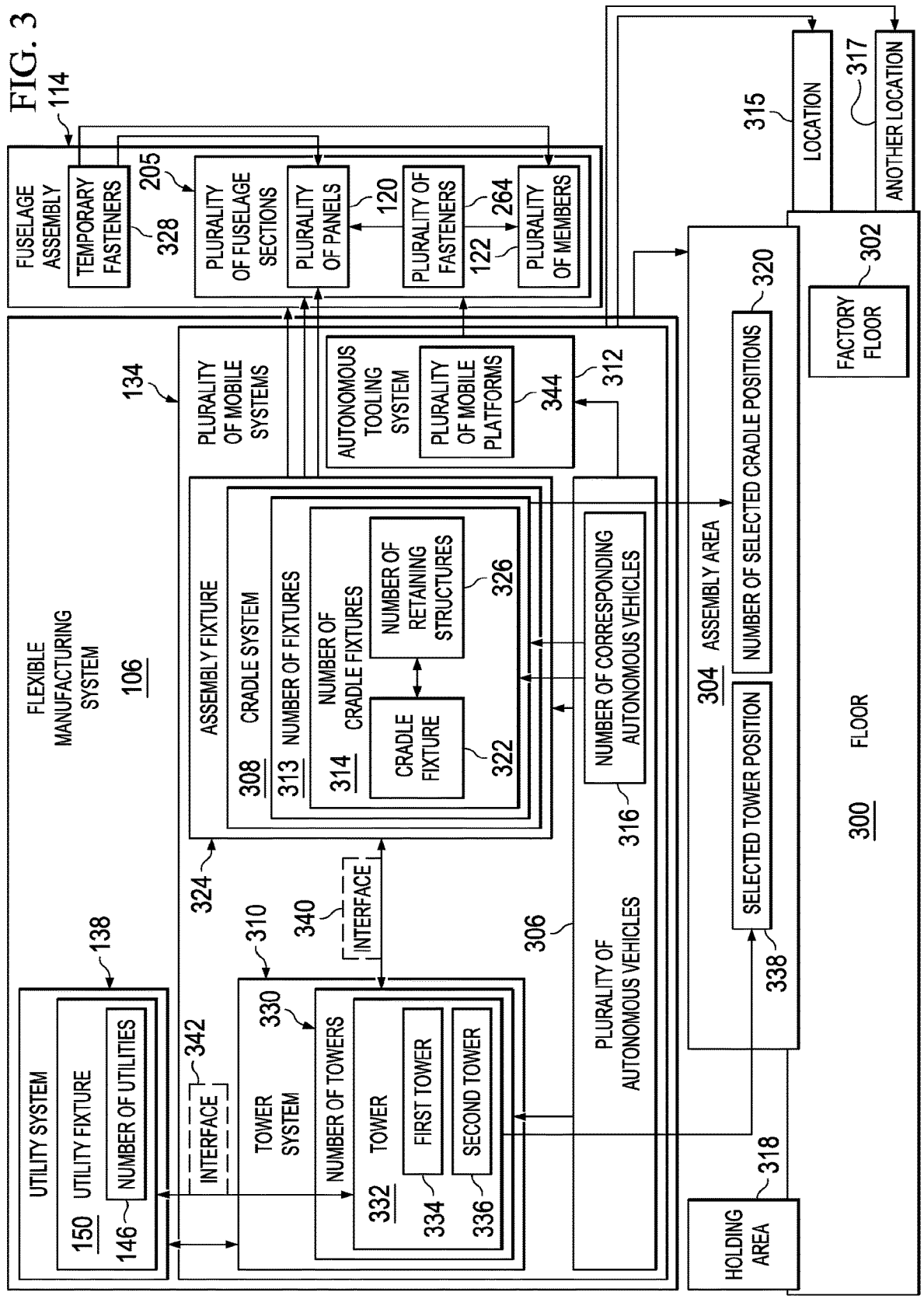
FIG. 3 is an illustration of a plurality of mobile systems of a flexible manufacturing system within a manufacturing environment in the form of a block diagram in accordance with an illustrative embodiment.

With reference now to FIG. 3, an illustration of plurality of mobile systems 134 of flexible manufacturing system 106 within manufacturing environment 100 from FIG. 1 is depicted in the form of a block diagram in accordance with an illustrative embodiment. As depicted, flexible manufacturing system 106 may be used to build fuselage assembly 114 on floor 300 of manufacturing environment 100. When manufacturing environment 100 takes the form of a factory, floor 300 may be referred to as factory floor 302.

In one illustrative example, floor 300 may be substantially smooth and substantially planar. For example, floor 300 may be substantially level. In other illustrative examples, one or more portions of floor 300 may be sloped, ramped, or otherwise uneven.

Assembly area 304 may be an area within manufacturing environment 100 designated for performing assembly process 110 in FIG. 1 to build a fuselage assembly, such as fuselage assembly 114. Assembly area 304 may also be referred to as a cell or a work cell. In this illustrative example, assembly area 304 may be a designated area on floor 300. However, in other illustrative examples, assembly area 304 may include a designated area on floor 300 as well as the area above this designated area. Any number of assembly areas may be present within manufacturing environment 100 such that any number of fuselage assemblies may be built concurrently within manufacturing environment 100.

As depicted, plurality of mobile systems 134 may include plurality of autonomous vehicles 306, cradle system 308, tower system 310, and autonomous tooling system 312. Each of plurality of mobile systems 134 may be drivable across floor 300. In other words, each of plurality of mobile systems 134 may be capable of being autonomously driven across floor 300 from one location 315 to another location 317 on floor 300.

In one illustrative example, each of plurality of autonomous vehicles 306 may take the form of an automated guided vehicle (AGV), which may be capable of operating independently without human direction or guidance. In some cases, plurality of autonomous vehicles 306 may be referred to as a plurality of automated guided vehicles (AGVs).

In this illustrative example, cradle system 308 may be used to support and hold fuselage assembly 114 during assembly process 110 in FIG. 1. In some cases, cradle system 308 may be referred to as a drivable cradle system. In still other cases, cradle system 308 may be referred to as an autonomously drivable cradle system.

Cradle system 308 may include number of fixtures 313. As used herein, a "number of" items may include one or more items. In this manner, number of fixtures 313 may include one or more fixtures. In some illustrative examples, number of fixtures 313 may be referred to as a number of drivable fixtures. In other illustrative examples, number of fixtures 313 may be referred to as a number of autonomously drivable fixtures.

Number of fixtures 313 may include number of cradle fixtures 314. In some illustrative examples, number of cradle fixtures 314 may be referred to as a number of drivable cradle fixtures. In other illustrative examples, number of cradle fixtures 314 may be referred to as a number of autonomously drivable cradle fixtures. Cradle fixture 322 may be an example of one of number of cradle fixtures 314.

Number of retaining structures 326 may be associated with each of number of cradle fixtures 314. Number of retaining structures 326 associated with each of number of cradle fixtures 314 may be engaged with and used to support fuselage assembly 114. For example, number of retaining structures 326 associated with cradle fixture 322 may be engaged with and used to support one or more of plurality of panels 120.

Number of cradle fixtures 314 may be autonomously driven across floor 300 of manufacturing environment 100 to assembly area 304. In one illustrative example, each of number of cradle fixtures 314 may be autonomously driven across floor 300 using a corresponding one of plurality of autonomous vehicles 306. In other words, without limitation, number of corresponding autonomous vehicles 316 in plurality of autonomous vehicles 306 may be used to drive number of cradle fixtures 314 across floor 300 into assembly area 304.

In this illustrative example, number of corresponding autonomous vehicles 316 may drive from, for example, without limitation, holding area 318, across floor 300, to assembly area 304. Holding area 318 may be an area in which at least one of plurality of autonomous vehicles 306, cradle system 308, tower system 310, autonomous tooling system 312, or control system 136 from FIG. 1 may be held when flexible manufacturing system 106 is not in use or when that particular device or system is not in use.

Holding area 318 may be referred to as a home area, a storage area, or a base area, depending on the implementation. Although holding area 318 is depicted as being located within manufacturing environment 100, holding area 318 may be located in some other area or environment outside of manufacturing environment 100 in other illustrative examples.

Number of corresponding autonomous vehicles 316 in plurality of autonomous vehicles 306 may drive number of cradle fixtures 314 into number of selected cradle positions 320. As used herein, a "position" may be comprised of a location, an orientation, or both. The location may be in two-dimensional coordinates or three-dimensional coordinates with respect to a reference coordinate system. The orientation may be a two-dimensional or three-dimensional orientation with respect to a reference coordinate system. This reference coordinate system may be, for example, without limitation, a fuselage coordinate system, an aircraft coordinate system, a coordinate system for manufacturing environment 100, or some other type of coordinate system.

When number of cradle fixtures 314 includes more than one cradle fixture such that number of selected cradle positions 320 includes more than one cradle position, these cradle positions may be positions selected relative to each other. In this manner, number of cradle fixtures 314 may be positioned such that number of cradle fixtures 314 are in number of selected cradle positions 320 relative to each other.

In these illustrative examples, number of corresponding autonomous vehicles 316 may be used to drive number of cradle fixtures 314 into number of selected cradle positions 320 within assembly area 304. "Driving" a component or a system across floor 300 may mean, for example, but not limited to, moving substantially the entirety of that component or system from one location to another location. For example, without limitation, driving cradle fixture 322 across floor 300 may mean moving the entirety of cradle fixture 322 from one location to another location. In other words, all or substantially all components that comprise cradle fixture 322 may be simultaneously moved together from one location to another location.

Once number of cradle fixtures 314 has been driven into number of selected cradle positions 320 in assembly area 304, number of cradle fixtures 314 may be coupled to each other and to tower system 310. Number of corresponding autonomous vehicles 316 may then drive away from number of cradle fixtures 314 to, for example, without limitation, holding area 318, once number of cradle fixtures 314 is positioned in number of selected cradle positions 320 within selected tolerances. In other illustrative examples, number of corresponding autonomous vehicles 316 may be comprised of a single autonomous vehicle that is used to drive each of number of cradle fixtures 314 into a corresponding selected position in number of selected cradle positions 320 within assembly area 304 one at a time.

In assembly area 304, number of cradle fixtures 314 may be configured to form assembly fixture 324. Assembly fixture 324 may be formed when the different cradle fixtures in number of cradle fixtures 314 have been placed in number of selected cradle positions 320 relative to each other. In some cases, assembly fixture 324 may be formed when number of cradle fixtures 314 have been coupled to each other while number of cradle fixtures 314 is in number of selected cradle positions 320 and when number of retaining structures 326 associated with each of number of cradle fixtures 314 has been adjusted to receive fuselage assembly 114.

In this manner, number of cradle fixtures 314 may form a single fixture entity, such as assembly fixture 324. Assembly fixture 324 may be used to support and hold fuselage assembly 114. In some cases, assembly fixture 324 may be referred to as an assembly fixture system or a fixture system. In some cases, assembly fixture 324 may be referred to as a drivable assembly fixture. In other cases, assembly fixture 324 may be referred to as an autonomously drivable assembly fixture.

Once assembly fixture 324 has been formed, number of cradle fixtures 314 may receive fuselage assembly 114. In other words, plurality of fuselage sections 205 may be engaged with number of cradle fixtures 314. In particular, plurality of fuselage sections 205 may be engaged with number of retaining structures 326 associated with each of number of cradle fixtures 314. Plurality of fuselage sections 205 may be engaged with number of cradle fixtures 314 in any number of ways.

When number of cradle fixtures 314 includes a single cradle fixture, that cradle fixture may be used to support and hold substantially the entire fuselage assembly 114. When number of cradle fixtures 314 includes multiple cradle fixtures, each of these cradle fixtures may be used to support and hold at least one corresponding fuselage section of plurality of fuselage sections 205.

In one illustrative example, each of plurality of fuselage sections 205 may be engaged with number of cradle fixtures 314 one at a time. For example, without limitation, all of the panels for a particular fuselage section in plurality of fuselage sections 205 may be positioned relative to each other and a corresponding cradle fixture in number of cradle fixtures 314 and then engaged with the corresponding cradle fixture. The remaining fuselage sections in plurality of fuselage sections 205 may then be formed and engaged with number of cradle fixtures 314 in a similar manner. In this manner, plurality of panels 120 may be engaged with number of cradle fixtures 314 by engaging at least a portion of plurality of panels 120 with number of retaining structures 326 associated with each of number of cradle fixtures 314 that makes up assembly fixture 324 such that plurality of panels 120 is supported by number of cradle fixtures 314.

As described in FIG. 2, plurality of panels 120 may include keel panels 222, side panels 220, and crown panels 218. In one illustrative example, all of keel panels 222 in FIG. 2 used to form keel 202 of fuselage assembly 114 in FIG. 2 may first be positioned relative to and engaged with number of cradle fixtures 314. Next, all of side panels 220 in FIG. 2 used to form sides 204 of fuselage assembly 114 in FIG. 2 may be positioned relative to and engaged with keel panels 222. Then, all of crown panels 218 in FIG. 2 used to form crown 200 of fuselage assembly 114 in FIG. 2 may be positioned relative to and engaged with side panels 220. In this manner, plurality of fuselage sections 205 may be concurrently assembled to form fuselage assembly 114.

In one illustrative example, each panel in plurality of panels 120 may have a corresponding portion of plurality of members 122 fully formed and associated with the panel prior to the panel being engaged with one of number of cradle fixtures 314. This corresponding portion of plurality of members 122 may be referred to as a support section. For example, support section 238 in FIG. 2 may be fully formed and associated with panel 216 in FIG. 2 prior to panel 216 being engaged with one of number of cradle fixtures 314 or another panel of plurality of panels 120 in FIG. 2. In other words, a corresponding portion of support members 242 in FIG. 2 may already be attached to panel 216 and a corresponding portion of connecting members 244 in FIG. 2 already installed to connect this portion of support members 242 to each other prior to panel 216 from FIG. 2 being engaged with one of number of cradle fixtures 314.

In other illustrative examples, plurality of members 122 may be associated with plurality of panels 120 after plurality of panels 120 have been engaged with each other and number of cradle fixtures 314. In still other illustrative examples, only a portion of plurality of members 122 may be associated with plurality of panels 120 prior to plurality of panels 120 being engaged with each other and number of cradle fixtures 314 and then a remaining portion of plurality of members 122 associated with plurality of panels 120 once plurality of panels 120 have been engaged with each other and number of cradle fixtures 314.

In some illustrative examples, one or more of support members 242 in FIG. 2, one or more of connecting members 244 in FIG. 2, or both may not be associated with panel 216 when panel 216 from FIG. 2 is engaged with one of number of cradle fixtures 314 or with one of the other panels in plurality of panels 120. For example, without limitation, frames 246 described in FIG. 2 may be added to panel 216 from FIG. 2 after panel 216 has been engaged with cradle fixture 322. In another example, stiffeners 250 described in FIG. 2 may be added to panel 216 from FIG. 2 after panel 216 has been engaged with cradle fixture 322.

Building fuselage assembly 114 may include engaging plurality of panels 120 with each other as plurality of panels 120 are built up on number of cradle fixtures 314 of assembly fixture 324. For example, adjacent panels in plurality of panels 120 may be connected by connecting at least a portion of the support members associated with the panels. Depending on the implementation, at least one of lap splices, butt splices, or other types of splices may be used to connect the adjacent panels in addition to or in place of connecting the corresponding support members of the adjacent panels.

As one illustrative example, the support members associated with two adjacent panels in plurality of panels 120 may be connected together using connecting members, thereby connecting the two adjacent panels. The two support members associated with these two adjacent panels may be, for example, without limitation, spliced, tied, clipped, tacked, pinned, joined, or fastened together in some other manner. When the two adjacent panels are hoop-wise adjacent, complementary frames may be connected in the hoop-wise direction. When the two adjacent panels are longitudinally adjacent, complementary stringers may be connected in the longitudinal direction.

In some cases, connecting complementary stringers, frames, or other support members on these two adjacent panels may be part of splicing these panels together. Adjacent panels may be connected together using any number of panel splices, stringer splices, frame splices, or other types of splices.

In one illustrative example, plurality of panels 120 may be temporarily connected to each other by temporarily fastening at least one of plurality of panels 120 or plurality of members 122 together using temporary fasteners or permanent fasteners. For example, without limitation, temporary clamps may be used to temporarily connect and hold in place two of plurality of panels 120 together. Temporarily connecting plurality of panels 120 together may be performed by at least one of temporarily connecting at least two plurality of panels 120 together, temporarily connecting at least two plurality of members 122 together, or temporarily connecting at least one of plurality of panels 120 to at least one of plurality of members 122 such that plurality of members 122 associated with plurality of panels 120 forms support structure 121 in FIG. 2 for fuselage assembly 114.

As one illustrative example, plurality of panels 120 may be temporarily tacked or pinned together using temporary fasteners 328 until plurality of fasteners 264 are installed to join plurality of panels 120 together to form fuselage assembly 114. Temporarily connecting plurality of panels 120 may temporarily connect together plurality of fuselage sections 205 from FIG. 2 formed by plurality of panels 120. Once plurality of fasteners 264 have been installed, temporary fasteners 328 may then be removed.

In this manner, plurality of panels 120 may be connected together in a number of different ways. Once plurality of panels 120 have been connected together, plurality of members 122 may be considered as forming support structure 121 for fuselage assembly 114. Connecting plurality of panels 120 together and forming support structure 121 may maintain desired compliance with outer mold line requirements and inner mold line requirements for fuselage assembly 114. In other words, plurality of panels 120 may be held together in place relative to each other such that fuselage assembly 114 formed using plurality of panels 120 meets outer mold line requirements and inner mold line requirements for fuselage assembly 114 within selected tolerances.

In particular, assembly fixture 324 may support plurality of panels 120 and support structure 121 associated with plurality of panels 120 such that fuselage assembly 114 built using plurality of panels 120 and support structure 121 has a shape and a configuration that is within selected tolerances. In this manner, this shape and configuration may be maintained within selected tolerances while supporting plurality of panels 120 and plurality of members 122 associated with plurality of panels 120 during the building of fuselage assembly 114. This shape may be at least partially determined by, for example, without limitation, the outer mold line requirements and inner mold line requirements for fuselage assembly 114. In some cases, the shape may be at least partially determined by the location and orientation of the frames and stringers of fuselage assembly 114.

In some cases, when the assembly of plurality of panels 120 and support structure 121 that comprise fuselage assembly 114 has reached a desired point, number of corresponding autonomous vehicles 316 may drive assembly fixture 324 out of assembly area 304. For example, fuselage assembly 114 may be driven across floor 300 into a different area within manufacturing environment 100, from floor 300 onto another floor in a different manufacturing environment, or from floor 300 onto another floor in some other area or environment.

In one illustrative example, assembly fixture 324 may be driven to some other location at which another assembly fixture is located such that the two assembly fixtures may be coupled to form a larger assembly fixture. As one illustrative example, assembly fixture 324 may be used to hold and support aft fuselage assembly 116 in FIG. 1, while another assembly fixture implemented in a manner similar to assembly fixture 324 may be used to hold and support forward fuselage assembly 117 in FIG. 1. Yet another assembly fixture implemented in a manner similar to assembly fixture 324 may be used to hold and support middle fuselage assembly 118 in FIG. 1.

Once these three fuselage assemblies have been built, the three assembly fixtures may be brought together to form a larger assembly fixture for holding aft fuselage assembly 116, middle fuselage assembly 118, and forward fuselage assembly 117 such that these three fuselage assemblies may be joined to form fuselage 102 described in FIG. 1. In particular, this larger assembly fixture may hold aft fuselage assembly 116, middle fuselage assembly 118, and forward fuselage assembly 117 in alignment with each other such that fuselage 102 may be built within selected tolerances.

In another illustrative example, a first assembly fixture and a second assembly fixture implemented in a manner similar to assembly fixture 324 may be used to hold and support aft fuselage assembly 116 and forward fuselage assembly 117, respectively, from FIG. 1. Once these two fuselage assemblies have been built, the two assembly fixtures may then be brought together to form a larger assembly fixture for holding the two fuselage assemblies such that these fuselage assemblies may be joined to form fuselage 102. The larger assembly fixture may hold aft fuselage assembly 116 and forward fuselage assembly 117 in alignment with each other such that fuselage 102 may be built within selected tolerances.

As depicted, tower system 310 includes number of towers 330. Tower 332 may be an example of one implementation for one of number of towers 330. Tower 332 may be configured to provide access to interior 236 of fuselage assembly 114 described in FIG. 2. In some illustrative examples, tower 332 may be referred to as a drivable tower. In other illustrative examples, tower 332 may be referred to as an autonomously drivable tower.

In one illustrative example, tower 332 may take the form of first tower 334. First tower 334 may also be referred to as an operator tower in some cases. In another illustrative example, tower 332 may take the form of second tower 336. Second tower 336 may also be referred to as a robotics tower in some cases. In this manner, number of towers 330 may include both first tower 334 and second tower 336.

First tower 334 may be configured substantially for use by a human operator, whereas second tower 336 may be configured substantially for use by a mobile platform having at least one robotic device associated with the mobile platform. In other words, first tower 334 may allow a human operator to access and enter interior 236 of fuselage assembly 114. Second tower 336 may allow a mobile platform to access and enter interior 236 of fuselage assembly 114.

First tower 334 and second tower 336 may be positioned relative to assembly fixture 324 at different times during assembly process 110. As one illustrative example, one of plurality of autonomous vehicles 306 may be used to move or autonomously drive first tower 334 from holding area 318 into selected tower position 338 within assembly area 304. Number of cradle fixtures 314 may then be autonomously driven, using number of corresponding autonomous vehicles 316, into number of selected cradle positions 320 relative to first tower 334, which is in selected tower position 338 within assembly area 304.

Second tower 336 may be exchanged for first tower 334 at some later stage during assembly process 110 in FIG. 1. For example, one of plurality of autonomous vehicles 306 may be used to autonomously drive first tower 334 out of assembly area 304 and back into holding area 318. The same autonomous vehicle or a different autonomous vehicle in plurality of autonomous vehicles 306 may then be used to autonomously drive second tower 336 from holding area 318 into selected tower position 338 within assembly area 304 that was previously occupied by first tower 334. Depending on the implementation, first tower 334 may be later exchanged for second tower 336.

In other illustrative examples, first tower 334 and second tower 336 may each have an autonomous vehicle in plurality of autonomous vehicles 306 fixedly associated with the tower. In other words, one of plurality of autonomous vehicles 306 may be integrated with first tower 334 and one of plurality of autonomous vehicles 306 may be integrated with second tower 336. For example, one of plurality of autonomous vehicles 306 may be considered part of or built into first tower 334. First tower 334 may then be considered capable of autonomously driving across floor 300. In a similar manner, one of plurality of autonomous vehicles 306 may be considered part of or built into second tower 336. Second tower 336 may then be considered capable of autonomously driving across floor 300.

Tower system 310 and assembly fixture 324 may be configured to form interface 340 with each other. Interface 340 may be a physical interface between tower system 310 and assembly fixture 324. Tower system 310 may also be configured to form interface 342 with utility system 138. In one illustrative example, interface 340 and interface 342 may be autonomously formed.

Interface 342 may be a physical interface between tower system 310 and utility system 138. In these illustrative examples, in addition to being physical interfaces, interface 340 and interface 342 may also be utility interfaces. For example, with respect to the utility of power, interface 340 and interface 342 may be considered electrical interfaces.

Utility system 138 is configured to distribute number of utilities 146 to tower system 310 when tower system 310 and utility system 138 are physically and electrically coupled through interface 342. Tower system 310 may then distribute number of utilities 146 to assembly fixture 324 formed by cradle system 308 when assembly fixture 324 and tower system 310 are physically and electrically coupled through interface 340. Number of utilities 146 may include at least one of power, air, hydraulic fluid, communications, water, or some other type of utility.

As depicted, utility system 138 may include utility fixture 150. Utility fixture 150 may be configured to receive number of utilities 146 from number of utility sources 148. Number of utility sources 148 may include, for example, without limitation, at least one of a power generator, a battery system, a water system, an electrical line, a communications system, a hydraulic fluid system, an air tank, or some other type of utility source. For example, utility fixture 150 may receive power from a power generator.

In one illustrative example, utility fixture 150 may be positioned relative to assembly area 304. Depending on the implementation, utility fixture 150 may be positioned inside assembly area 304 or outside of assembly area 304.

In some illustrative examples, utility fixture 150 may be associated with floor 300. Depending on the implementation, utility fixture 150 may be permanently associated with floor 300 or temporarily associated with floor 300. In other illustrative examples, utility fixture 150 may be associated with some other surface of manufacturing environment 100, such as a ceiling, or some other structure in manufacturing environment 100. In some cases, utility fixture 150 may be embedded within floor 300.

In one illustrative example, first tower 334 may be autonomously driven into selected tower position 338 with respect to floor 300 relative to utility fixture 150 such that interface 342 may be formed between first tower 334 and utility fixture 150. Once interface 342 has been formed, number of utilities 146 may flow from utility fixture 150 to first tower 334. Assembly fixture 324 may then autonomously form interface 340 with first tower 334 to form a network of utility cables between first tower 334 and assembly fixture 324. Once both interface 342 and interface 340 have been formed, number of utilities 146 received at utility fixture 150 may flow from utility fixture 150 to first tower 334 and to each of number of cradle fixtures 314 that forms assembly fixture 324. In this manner, first tower 334 may function as a conduit or "middleman" for distributing number of utilities 146 to assembly fixture 324.

When interface 340 has been formed between second tower 336 and assembly fixture 324 and interface 342 has been formed between second tower 336 and utility fixture 150, number of utilities 146 may be provided to second tower 336 and assembly fixture 324 in a similar manner as described above. Thus, utility fixture 150 may distribute number of utilities 146 to tower system 310 and assembly fixture 324 without tower system 310 and cradle assembly fixture 324 having to separately connect to number of utility sources 148 or any other utility sources.

Autonomous tooling system 312 may be used to assemble plurality of panels 120 and support structure 121 while fuselage assembly 114 is being supported and held by assembly fixture 324. Autonomous tooling system 312 may include plurality of mobile platforms 344. Each of plurality of mobile platforms 344 may be configured to perform one or more of operations 124 in assembly process 110 described in FIG. 1. In particular, plurality of mobile platforms 344 may be autonomously driven into selected positions relative to plurality of panels 120 within selected tolerances to autonomously perform operations 124 that join plurality of panels 120 together to build fuselage assembly 114. Plurality of mobile platforms 344 are described in greater detail in FIG. 4 below.

In this illustrative example, set of controllers 140 in control system 136 may generate commands 142 as described in FIG. 1 to control the operation of at least one of cradle system 308, tower system 310, utility system 138, autonomous tooling system 312, or plurality of autonomous vehicles 306. Set of controllers 140 in FIG. 1 may communicate with at least one of cradle system 308, tower system 310, utility system 138, autonomous tooling system 312, or plurality of autonomous vehicles 306 using any number of wireless communications links, wired communications links, optical communications links, other types of communications links, or combination thereof.

In this manner, plurality of mobile systems 134 of flexible manufacturing system 106 may be used to automate the process of building fuselage assembly 114. Plurality of mobile systems 134 may enable fuselage assembly 114 to be built substantially autonomously with respect to joining together plurality of panels 120 to reduce the overall time, effort, and human resources needed.

Flexible manufacturing system 106 may build fuselage assembly 114 up to the point needed to move fuselage assembly 114 to the next stage in manufacturing process 108 for building fuselage 102 or the next stage in the manufacturing process for building aircraft 104, depending on the implementation. In some cases, cradle system 308 in the form of assembly fixture 324 may continue carrying and supporting fuselage assembly 114 during one or more of these later stages in manufacturing process 108 for building fuselage 102 and aircraft 104.

Figure 4:
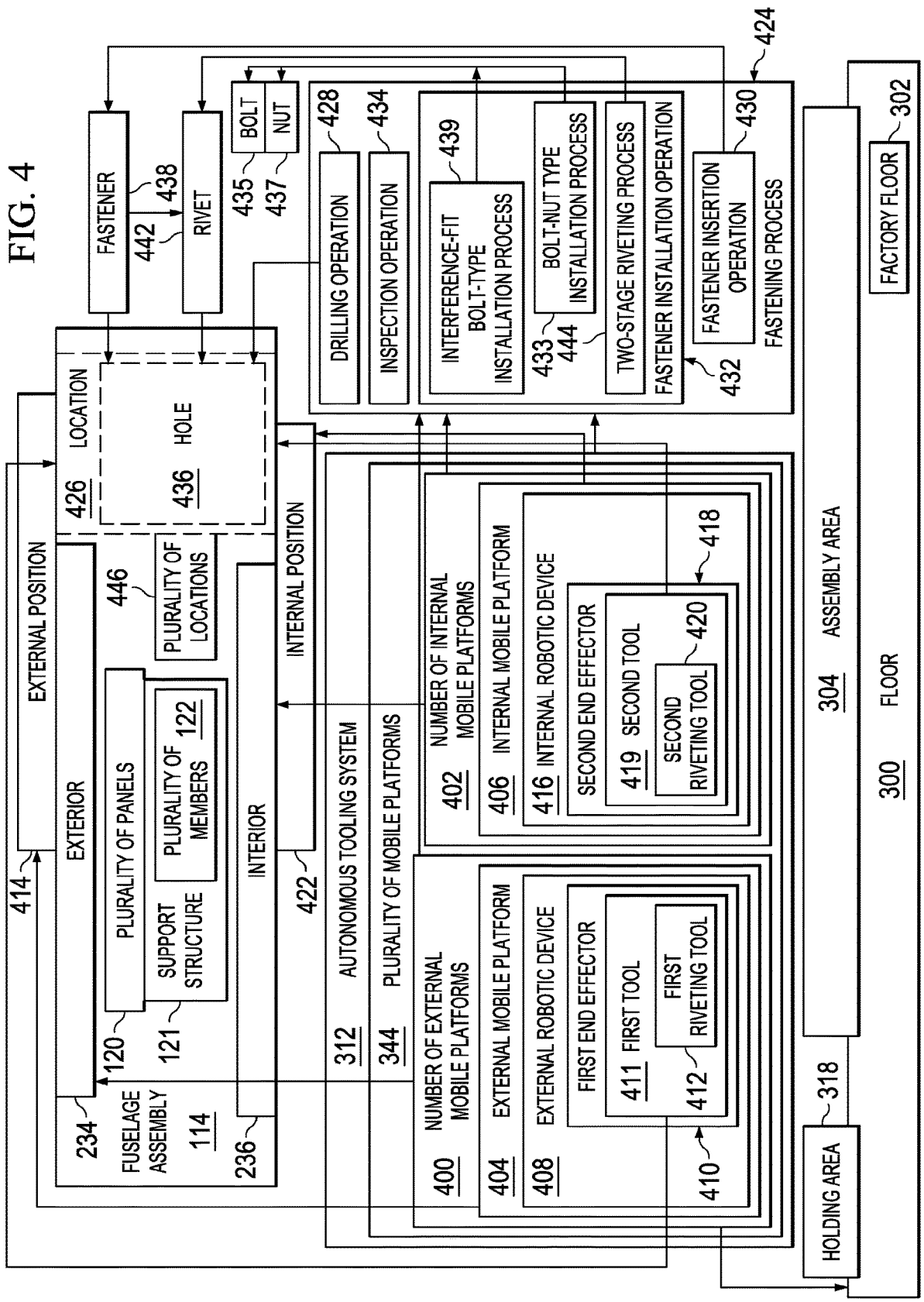
FIG. 4 is an illustration a plurality of mobile platforms in the form of a block diagram in accordance with an illustrative embodiment.

With reference now to FIG. 4, an illustration of plurality of mobile platforms 344 from FIG. 3 is depicted in the form of a block diagram in accordance with an illustrative embodiment. As depicted, plurality of mobile platforms 344 may include number of external mobile platforms 400 and number of internal mobile platforms 402. In this manner, plurality of mobile platforms 344 may include at least one external mobile platform and at least one internal mobile platform.

In some illustrative examples, number of external mobile platforms 400 may be referred to as a number of drivable external mobile platforms. Similarly, in some cases, number of internal mobile platforms 402 may be referred to as a number of drivable internal mobile platforms. In other illustrative examples, number of external mobile platforms 400 and number of internal mobile platforms 402 may be referred to as a number of autonomously drivable external mobile platforms and a number of autonomously drivable internal mobile platforms, respectively.

External mobile platform 404 may be an example of one of number of external mobile platforms 400 and internal mobile platform 406 may be an example of one of number of internal mobile platforms 402. External mobile platform 404 and internal mobile platform 406 may be platforms that are autonomously drivable. Depending on the implementation, each of external mobile platform 404 and internal mobile platform 406 may be configured to autonomously drive across floor 300 on its own or with the assistance of one of plurality of autonomous vehicles 306 from FIG. 3.

As one illustrative example, without limitation, external mobile platform 404 may be autonomously driven across floor 300 using a corresponding one of plurality of autonomous vehicles 306. In some illustrative examples, external mobile platform 404 and this corresponding one of plurality of autonomous vehicles 306 may be integrated with each other. For example, the autonomous vehicle may be fixedly associated with external mobile platform 404. An entire load of external mobile platform 404 may be transferable to the autonomous vehicle such that driving the autonomous vehicle across floor 300 drives external mobile platform 404 across floor 300.

External mobile platform 404 may be driven from, for example, without limitation, holding area 318 to a position relative to exterior 234 of fuselage assembly 114 to perform one or more operations 124 in FIG. 1. As depicted, at least one external robotic device 408 may be associated with external mobile platform 404. In this illustrative example, external robotic device 408 may be considered part of external mobile platform 404. In other illustrative examples, external robotic device 408 may be considered a separate component that is physically attached to external mobile platform 404. External robotic device 408 may take the form of, for example, without limitation, a robotic arm.

External robotic device 408 may have first end effector 410. Any number of tools may be associated with first end effector 410. These tools may include, for example, without limitation, at least one of a drilling tool, a fastener insertion tool, a fastener installation tool, an inspection tool, or some other type of tool. In particular, any number of fastening tools may be associated with first end effector 410.

As depicted, first tool 411 may be associated with first end effector 410. In one illustrative example, first tool 411 may be any tool that is removably associated with first end effector 410. In other words, first tool 411 associated with first end effector 410 may be changed as various operations need to be performed. For example, without limitation, first tool 411 may take the form of one type of tool, such as a drilling tool, to perform one type of operation. This tool may then be exchanged with another type of tool, such as a fastener insertion tool, to become the new first tool 411 associated with first end effector 410 to perform a different type of operation.

In one illustrative example, first tool 411 may take the form of first riveting tool 412. First riveting tool 412 may be used to perform riveting operations. In some illustrative examples, a number of different tools may be exchanged with first riveting tool 412 and associated with first end effector 410. For example, without limitation, first riveting tool 412 may be exchangeable with a drilling tool, a fastener insertion tool, a fastener installation tool, an inspection tool, or some other type of tool.

External mobile platform 404 may be autonomously driven across floor 300 and positioned relative to assembly fixture 324 in FIG. 3 supporting fuselage assembly 114 to position first end effector 410 and first tool 411 associated with first end effector 410 relative to one of plurality of panels 120. For example, external mobile platform 404 may be autonomously driven across floor 300 to external position 414 relative to assembly fixture 324. In this manner, first tool 411 carried by external mobile platform 404 may be macro-positioned using external mobile platform 404.

Once in external position 414, first end effector 410 may be autonomously controlled using at least external robotic device 408 to position first tool 411 associated with first end effector 410 relative to a particular location on an exterior-facing side of one of plurality of panels 120. In this manner, first tool 411 may be micro-positioned relative to the particular location.

Internal mobile platform 406 may be located on second tower 336 in FIG. 3 when internal mobile platform 406 is not in use. When interface 342 described in FIG. 3 is formed between second tower 336 and assembly fixture 324, internal mobile platform 406 may be driven from second tower 336 into interior 236 of fuselage assembly 114 and used to perform one or more of operations 124. In one illustrative example, internal mobile platform 406 may have a movement system that allows internal mobile platform 406 to move from second tower 336 onto a floor inside fuselage assembly 114.

At least one internal robotic device 416 may be associated with internal mobile platform 406. In this illustrative example, internal robotic device 416 may be considered part of internal mobile platform 406. In other illustrative examples, internal robotic device 416 may be considered a separate component that is physically attached to internal mobile platform 406. Internal robotic device 416 may take the form of, for example, without limitation, a robotic arm.

Internal robotic device 416 may have second end effector 418. Any number of tools may be associated with second end effector 418. For example, without limitation, at least one of a drilling tool, a fastener insertion tool, a fastener installation tool, an inspection tool, or some other type of tool may be associated with second end effector 418. In particular, any number of fastening tools may be associated with second end effector 418.

As depicted, second tool 419 may be associated with second end effector 418. In one illustrative example, second tool 419 may be any tool that is removably associated with second end effector 418. In other words, second tool 419 associated with second end effector 418 may be changed as various operations need to be performed. For example, without limitation, first tool 411 may take the form of one type of tool, such as a drilling tool, to perform one type of operation. This tool may then be exchanged with another type of tool, such as a fastener insertion tool, to become the new first tool 411 associated with first end effector 410 to perform a different type of operation.

In one illustrative example, second tool 419 may take the form of second riveting tool 420. Second riveting tool 420 may be associated with second end effector 418. Second riveting tool 420 may be used to perform riveting operations. In some illustrative examples, a number of different tools may be exchanged with second riveting tool 420 and associated with second end effector 418. For example, without limitation, second riveting tool 420 may be exchangeable with a drilling tool, a fastener insertion tool, a fastener installation tool, an inspection tool, or some other type of tool.

Internal mobile platform 406 may be driven from second tower 336 into fuselage assembly 114 and positioned relative to interior 236 of fuselage assembly 114 to position second end effector 418 and second tool 419 associated with second end effector 418 relative to one of plurality of panels 120. In one illustrative example, internal mobile platform 406 may be autonomously driven onto one of number of floors 266 in FIG. 2 into internal position 422 within fuselage assembly 114 relative to fuselage assembly 114. In this manner, second tool 419 may be macro-positioned into internal position 422 using internal mobile platform 406.

Once in internal position 422, second end effector 418 may be autonomously controlled to position second tool 419 associated with second end effector 418 relative to a particular location on an interior-facing side of one of plurality of panels 120 or an interior-facing side of one of plurality of members 122 in FIG. 2 that make up support structure 121. In this manner, second tool 419 may be micro-positioned relative to the particular location.

In one illustrative example, external position 414 for external mobile platform 404 and internal position 422 for internal mobile platform 406 may be selected such that fastening process 424 may be performed at location 426 on fuselage assembly 114 using external mobile platform 404 and internal mobile platform 406. Fastening process 424 may include any number of operations. In one illustrative example, fastening process 424 may include at least one of drilling operation 428, fastener insertion operation 430, fastener installation operation 432, inspection operation 434, or some other type of operation.

As one specific example, drilling operation 428 may be performed autonomously using first tool 411 associated with first end effector 410 of external mobile platform 404 or second tool 419 associated with second end effector 418 of internal mobile platform 406. For example, without limitation, first tool 411 or second tool 419 may take the form of a drilling tool for use in performing drilling operation 428. Drilling operation 428 may be autonomously performed using first tool 411 or second tool 419 to form hole 436 at location 426. Hole 436 may pass through at least one of two panels in plurality of panels 120, two members of a plurality of members 122, or a panel and one of plurality of members 122.

Fastener insertion operation 430 may be performed autonomously using first tool 411 associated with first end effector 410 of external mobile platform 404 or second tool 419 associated with second end effector 418 of internal mobile platform 406. Fastener insertion operation 430 may result in fastener 438 being inserted into hole 436.

Fastener installation operation 432 may then be performed autonomously using at least one of first tool 411 associated with first end effector 410 of external mobile platform 404 or second tool 419 associated with second end effector 418 of internal mobile platform 406. In one illustrative example, fastener installation operation 432 may be performed autonomously using first tool 411 in the form of first riveting tool 412 and second tool 419 in the form of second riveting tool 420 such that fastener 438 becomes rivet 442 installed at location 426. Rivet 442 may be a fully installed rivet. Rivet 442 may be one of plurality of fasteners 264 described in FIG. 2.

In one illustrative example, fastener installation operation 432 may take the form of bolt-nut type installation process 433. First tool 411 associated with first end effector 410 may be used to, for example, without limitation, install bolt 435 through hole 436. Second tool 419 associated with second end effector 418 may then be used to install nut 437 over bolt 435. In some cases, installing nut 437 may include applying a torque sufficient to nut 437 such that a portion of nut 437 breaks off. In these cases, nut 437 may be referred to as a frangible collar.

In another illustrative example, fastener installation operation 432 may take the form of interference-fit bolt-type installation process 439. First tool 411 associated with first end effector 410 may be used to, for example, without limitation, install bolt 435 through hole 436 such that an interference fit is created between bolt 435 and hole 436. Second tool 419 associated with second end effector 418 may then be used to install nut 437 over bolt 435.

In yet another illustrative example, fastener installation operation 432 may take the form of two-stage riveting process 444. Two-stage riveting process 444 may be performed using, for example, without limitation, first riveting tool 412 associated with external mobile platform 404 and second riveting tool 420 associated with internal mobile platform 406.

For example, first riveting tool 412 and second riveting tool 420 may be positioned relative to each other by external mobile platform 404 and internal mobile platform 406, respectively. For example, external mobile platform 404 and external robotic device 408 may be used to position first riveting tool 412 relative to location 426 at exterior 234 of fuselage assembly 114. Internal mobile platform 406 and internal robotic device 416 may be used to position second riveting tool 420 relative to the same location 426 at interior 236 of fuselage assembly 114.

First riveting tool 412 and second riveting tool 420 may then be used to perform two-stage riveting process 444 to form rivet 442 at location 426. Rivet 442 may join at least two of plurality of panels 120 together, a panel in plurality of panels 120 to support structure 121 formed by plurality of members 122, or two panels in plurality of panels 120 to support structure 121.

In this example, two-stage riveting process 444 may be performed at each of plurality of locations 446 on fuselage assembly 114 to install plurality of fasteners 264 as described in FIG. 2. Two-stage riveting process 444 may ensure that plurality of fasteners 264 in FIG. 2 are installed at plurality of locations 446 with a desired quality and desired level of accuracy.

In this manner, internal mobile platform 406 may be autonomously driven and operated inside fuselage assembly 114 to position internal mobile platform 406 and second riveting tool 420 associated with internal mobile platform 406 relative to plurality of locations 446 on fuselage assembly 114 for performing assembly process 110 described in FIG. 1. Similarly, external mobile platform 404 may be autonomously driven and operated around fuselage assembly 114 to position external mobile platform 404 and first riveting tool 412 associated with external mobile platform 404 relative to plurality of locations 446 on fuselage assembly 114 for performing operations 124.

Figure 5:
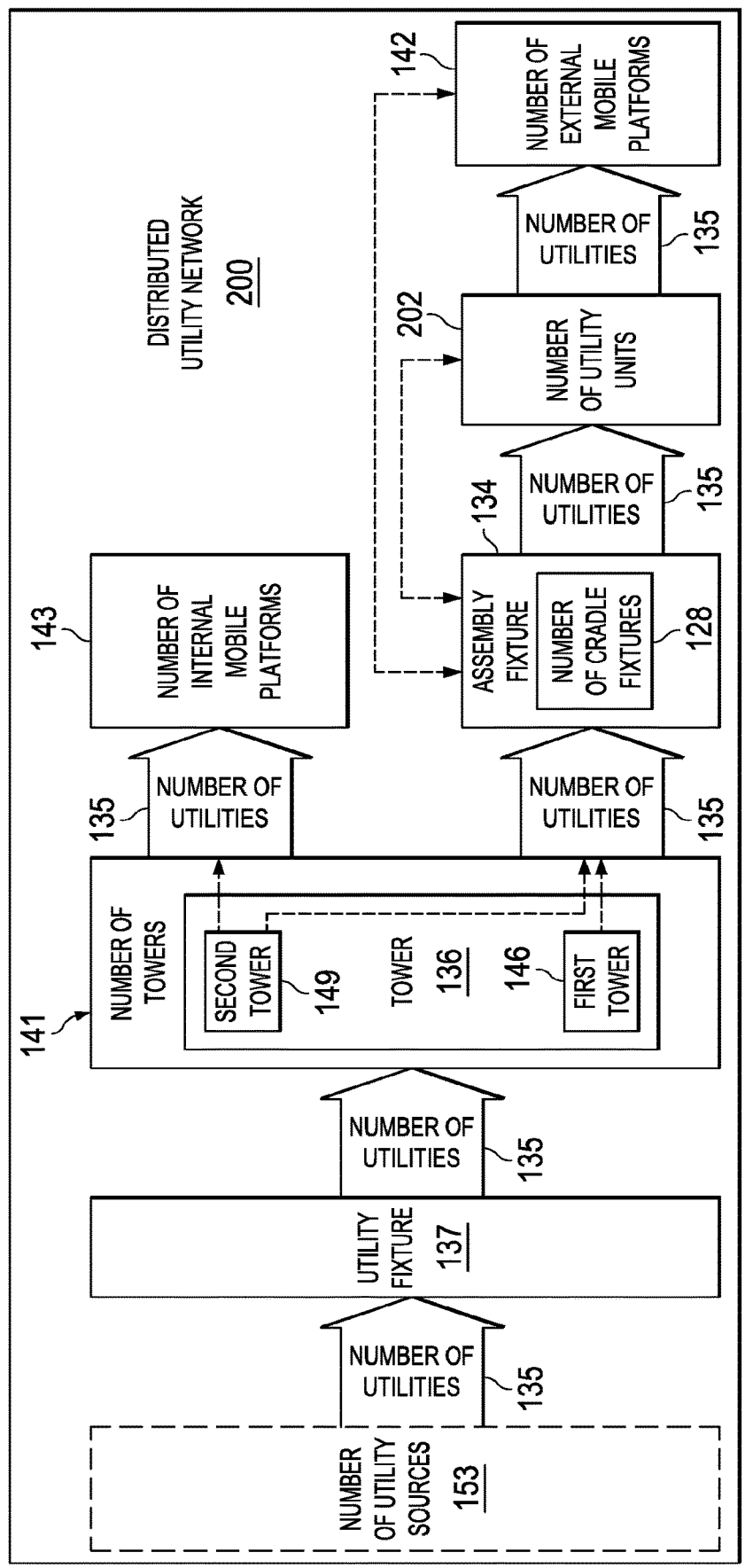
FIG. 5 is an illustration of a flow of a number of utilities across a distributed utility network in the form of a block diagram in accordance with an illustrative embodiment.

With reference now to FIG. 5, an illustration of a flow of number of utilities 146 across distributed utility network 144 from FIG. 1 is depicted in the form of a block diagram in accordance with an illustrative embodiment. As depicted, number of utilities 146 may be distributed across distributed utility network 144.

Distributed utility network 144 may include, for example, without limitation, number of utility sources 148, utility fixture 150, number of towers 330, assembly fixture 324, number of external mobile platforms 400, and number of utility units 500. In some cases, distributed utility network 144 may also include number of internal mobile platforms 402. In some illustrative examples, number of utility sources 148 may be considered separate from distributed utility network 144.

In this illustrative example, only one of number of towers 330 may be included in distributed utility network 144 at a time. When first tower 334 is used, distributed utility network 144 may be formed when utility fixture 150 is coupled to number of utility sources 148, first tower 334 is coupled to utility fixture 150, assembly fixture 324 is coupled to first tower 334, and number of external mobile platforms 400 is coupled to number of utility units 500.

Number of utility units 500 may be associated with number of cradle fixtures 314 of assembly fixture 324 or separated from number of cradle fixtures 314. For example, without limitation, a number of dual interfaces may be created between number of external mobile platforms 400, number of utility units 500, and number of cradle fixtures 314 using one or more dual-interface couplers.

When second tower 336 is used, distributed utility network 144 may be formed when utility fixture 150 is coupled to number of utility sources 148, second tower 336 is coupled to utility fixture 150, assembly fixture 324 is coupled to second tower 336, number of internal mobile platforms 402 is coupled to second tower 336, and number of external mobile platforms 400 is coupled to number of utility units 500, which may be associated with number of cradle fixtures 314 or separated from number of cradle fixtures 314. Number of internal mobile platforms 402 may receive number of utilities 146 through a number of cable management systems associated with second tower 336.

In this manner, number of utilities 146 may be distributed across distributed utility network 144 using a single utility fixture 150. This type of distributed utility network 144 may reduce the number of utility components, utility cables, and other types of devices needed to provide number of utilities 146 to the various components in distributed utility network 144. Further, with this type of distributed utility network 144, starting from at least utility fixture 150, number of utilities 146 may be provided completely above floor 300 of manufacturing environment in FIG. 1.

Figure 6:
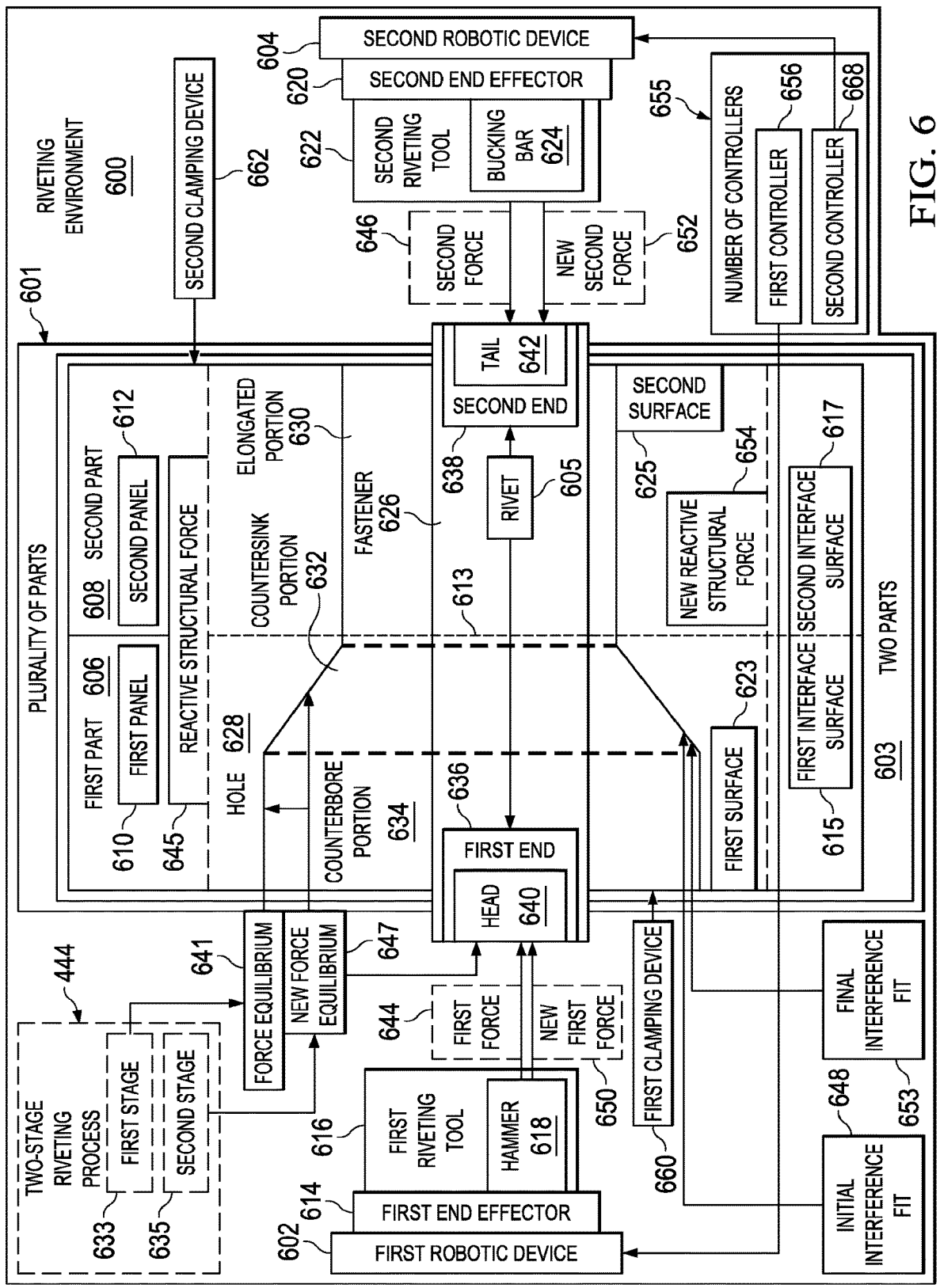
FIG. 6 is an illustration of a riveting environment in the form of a block diagram in accordance with an illustrative embodiment.

With reference now to FIG. 6, an illustration of a riveting environment is depicted in the form of a block diagram in accordance with an illustrative embodiment. Riveting environment 600 may be an example of an environment in which rivet 605 may be installed to join plurality of parts 601. Rivet 605 may be installed using, for example, two-stage riveting process 444 from FIG. 4.

In one illustrative example, plurality of parts 601 may include two parts 603. Two parts 603 may include first part 606 and second part 608. First part 606 and second part 608 may meet at interface 613. In particular, interface 613 may be formed at first interface surface 615 of first part 606 and second interface surface 617 of second part 608. In other illustrative examples, first interface surface 615 and second interface surface 617 may be referred to as a first faying surface and a second faying surface, respectively.

As depicted, first part 606 may take the form of first panel 610 and second part 608 may take the form of second panel 612. First panel 610 and second panel 612 may be examples of panels in plurality of panels 120 in FIG. 1. In other illustrative examples, second part 608 may take the form of a member, such as one of plurality of members 122 in FIG. 1. In particular, second part 608 may take the form of a support member, such as one of plurality of support members 242 in FIG. 2.

Rivet 605 may be installed to join first part 606 and second part 608. In other illustrative examples, rivet 605 may be installed to join first part 606, second part 608, and a third part (not shown) together. Two-stage riveting process 444 from FIG. 4 may be used to fully install rivet 605.

Rivet 605 may be installed using first robotic device 602 and second robotic device 604. In one illustrative example, first robotic device 602 may take the form of external robotic device 408 in FIG. 4. In this example, second robotic device 604 may take the form of internal robotic device 416 in FIG. 4.

As depicted, first end effector 614 may be associated with first robotic device 602 and first riveting tool 616 may be associated with first end effector 614. First riveting tool 616 may take the form of, for example, without limitation, hammer 618. In one illustrative example, first end effector 614 and first riveting tool 616 may take the form of first end effector 410 and first riveting tool 412, respectively, in FIG. 4.

Further, second end effector 620 may be associated with second robotic device 604 and second riveting tool 622 may be associated with second end effector 620. Second riveting tool 622 may take the form of, for example, without limitation, bucking bar 624. In one illustrative example, second end effector 620 and second riveting tool 622 may take the form of second end effector 418 and second riveting tool 420, respectively, in FIG. 4.

Hole 628 may be drilled through first part 606 and second part 608. As depicted, hole 628 may extend from first surface 623 of first part 606 to second surface 625 of second part 608. Fastener 626 may be inserted into hole 628. In this illustrative example, fastener 626 may have first end 636 and second end 638.

In this illustrative example, fastener 626 may be inserted through hole 628 in a direction from first part 606 to second part 608. Fastener 626 may be inserted such that a portion of fastener 626 at first end 636 of fastener 626 remains outside of first surface 623 of first part 606 and a portion of fastener 626 at second end 638 of fastener 626 extends past second surface 625 of second part 608. In other words, fastener 626 may protrude outside of hole 628 past both first surface 623 and second surface 625.

Fastener 626 may have head 640 at first end 636. In some illustrative examples, hole 628 may have elongated portion 630, countersink portion 632, and counterbore portion 634. Elongated portion 630 may be the portion having a substantially same diameter with respect to a center axis through hole 628. Elongated portion 630 may also be referred to as a shaft of fastener 626 in some illustrative examples. In other illustrative examples, hole 628 may have only elongated portion 630 and countersink portion 632. In still other illustrative examples, hole 628 may only have elongated portion 630.

First stage 633 of two-stage riveting process 444 may be performed by applying first force 644 to head 640 of fastener 626 and applying second force 646 to second end 638 of fastener 626 in which first force 644 is greater than second force 646. First riveting tool 616 may apply first force 644, while second riveting tool 622 may apply second force 646.

In particular, performing first stage 633 of two-stage riveting process 444 may create initial interference fit 648 between fastener 626 and at least a portion of hole 628. More specifically, initial interference fit 648 may be created between fastener 626 and a portion of hole 628 extending from first surface 623 in a direction towards second part 608. Performing first stage 633 of two-stage riveting process 444 may cause a shape of at least a portion of fastener 626 to change. For example, without limitation, the shape of at least one of head 640 at first end 636, second end 638, or at least a portion of fastener 626 between head 640 and second end 638 may change in response to the application of first force 644 to head 640 and second force 646 to second end 638.

Force equilibrium 641 may be created by first force 644, second force 646, and reactive structural force 645. Reactive structural force 645 may be the force of deflection of first part 606 and second part 608 in response to first force 644. In this illustrative example, force equilibrium 641 is created when first force 644 substantially equals the sum of second force 646 and reactive structural force 645.

In particular, reactive structural force 645 may be generated by first part 606 and second part 608 structurally compensating for a force differential between first force 644 and second force 646. Reactive structural force 645 may be substantially equal to a difference between first force 644 being applied to head 640 of fastener 626 in hole 628 extending through two parts 603 and second force 646 that is applied to second end 638 of fastener 626. In this manner, this structural compensation by first part 606 and second part 608 may ensure that force equilibrium 641 is substantially maintained.

After first stage 633 of two-stage riveting process 444, fastener 626 may be considered a partially formed rivet. In particular, first stage 633 may transform fastener 626 into a partially formed rivet having an interference fit within selected tolerances. This interference fit may be initial interference fit 648.

Once initial interference fit 648 has been created, at least one of first force 644 or second force 646 may be adjusted to form new first force 650 and new second force 652. New second force 652 may be greater than new first force 650. At least one of new first force 650 or new second force 652 may be different from the original first force 644 or original second force 646, respectively.

In this illustrative example, second stage 635 may be performed by applying new first force 650 to head 640 of fastener 626 using first riveting tool 616 and applying new second force 652 to second end 638 of fastener 626 using second riveting tool 622. Applying new second force 652 to second end 638, while first riveting tool 616 applies new first force 650 to first end 636, may create final interference fit 653 between fastener 626 and hole 628.

In particular, final interference fit 653 may be created such that final interference fit 653 at a first side of interface 613, which may be at first interface surface 615 of first part 606, may be equal to final interference fit 653 at a second side of interface 613, which may be at second interface surface 617 of second part 608. In other words, final interference fit 653 may be substantially equal across interface 613.

In particular, during second stage 635, second riveting tool 622 may change a shape at second end 638 of fastener 626 to form tail 642 by applying new second force 652 to second end 638, while first riveting tool 616 applies new first force 650 to first end 636. Once tail 642 has been formed, fastener 626 may be referred to as rivet 605 that has been fully installed. In some cases, some other portion of fastener 626 may change shape during second stage 635. For example, in addition to second end 638, head 640, at least a portion of fastener 626 between head 640 and second end 638, or both may change shape in response to the application of new first force 650 to head 640 and new second force 652 to second end 638.

New force equilibrium 647 may be created by new first force 650, new second force 652, and new reactive structural force 654. New reactive structural force 654 may be the force of deflection of first part 606 and second part 608 in response to the application of new second force 652. In one illustrative example, new force equilibrium 647 is created when new second force 652 substantially equals the sum of new first force 650 and new reactive structural force 654.

In particular, new reactive structural force 654 may be generated by first part 606 and second part 608 structurally compensating for a new force differential between new first force 650 and new second force 652. New reactive structural force 654 may be substantially equal to a difference between new first force 650 being applied to head 640 of fastener 626 in hole 628 extending through two parts 603 and new second force 652 being applied to second end 638 of fastener 626. In this manner, this structural compensation by first part 606 and second part 608 may ensure that new force equilibrium 647 is substantially maintained.

In some illustrative examples, final interference fit 653 may be substantially uniform along an entire length of hole 628. In other illustrative examples, final interference fit 653 may be substantially uniform across interface 613 but may be different near at least one of first surface 623 of first part 606 or second surface 625 of second part 608. In one illustrative example, final interference fit 653 near second surface 625 may be tighter than final interference fit 653 near first surface 623.

Having final interference fit 653 be substantially uniform across interface 613 may improve the quality of the formed rivet 605. In particular, with this final interference fit 653, the joining strength between two parts 603 may be improved. This type of installation may improve the fatigue life of the joint between two parts 603. Further, installing rivet 605 having final interference fit 653 may enhance the joining of two parts 603 in a manner that improves the overall strength of the structure comprising two parts 603.

First robotic device 602 and second robotic device 604 may be controlled using number of controllers 655 to perform two-stage riveting process 444. Number of controllers 655 may include one or more controllers, depending on the implementation, which may belong to set of controllers 140 described in FIG. 1. In one illustrative example, number of controllers 655 may include first controller 656 and second controller 658, each of which may be an example of one implementation for a controller in set of controllers 140 in FIG. 1.

First controller 656 may generate a first number of commands that cause first robotic device 602, and thereby, first riveting tool 616, to apply first force 644 to head 640 of fastener 626 during first stage 633 and new first force 650 to head 640 of fastener 626 during second stage 635. Second controller 658 may generate a second number of commands that cause second robotic device 604, and thereby, second riveting tool 622, to apply second force 646 to second end 638 of fastener 626 during first stage 633 and new second force 652 to second end 638 of fastener 626 during second stage 635.

In this manner, set of controllers 655 may command first robotic device 602 and second robotic device 604 to perform first stage 633 and second stage 635 of two-stage riveting process 444. This type of control may ensure that rivet 605 is installed having final interference fit 653 that is within selected tolerances. In one illustrative example, final interference fit 653 may be substantially uniform across interface 613.

In one illustrative example, first clamping device 660 may be associated with first robotic device 602 and second clamping device 662 may be associated with second robotic device 604. First clamping device 660 and second clamping device 662 may be used to clamp first part 606 and second part 608 together prior to first force 644 being applied to first end 636 of fastener 626. First clamping device 660 may apply a first clamping force to first surface 623 of first part 606 and second clamping device 662 may apply a second force substantially equal to the first clamping force to second surface 625 of second part 608 to clamp these parts together.

Once first part 606 and second part 608 are clamped together, hole 628 may be drilled. Thereafter, fastener 626 may be inserted into hole 628 while first part 606 and second part 608 are clamped together. Next two-stage riveting process 444 may be performed using fastener 626 to install rivet 605.

Clamping first part 606 and second part 608 together using first clamping device 660 and second clamping device 662 may ensure that first part 606 and second part 608 are held substantially in place relative to each other and substantially in contact with each other during the creation of initial interference fit 648 during first stage 633 of two-stage riveting process 444. In other words, first part 606 and second part 608 may be clamped to ensure that first part 606 does not move relative to second part 608 before and while first force 644 is applied to head 640 to form initial interference fit 648.

In this illustrative example, first part 606 and second part 608 may be unclamped prior to second force 646 being applied to second end 638 of fastener 626. First part 606 and second part 608 may no longer need to be clamped because initial interference fit 648 has been formed and first riveting tool 616 remains abutted against head 640 after initial interference fit 648 has been formed.

The illustrations in FIGS. 1-6 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some cases, more than one flexible manufacturing system may be present within manufacturing environment 100. These multiple flexible manufacturing systems may be used to build multiple fuselage assemblies within manufacturing environment 100. In other illustrative examples, flexible manufacturing system 106 may include multiple cradle systems, multiple tower systems, multiple utility systems, multiple autonomous tooling systems, and multiple pluralities of autonomous vehicles such that multiple fuselage assemblies may be built within manufacturing environment 100.

In some illustrative examples, utility system 138 may include multiple utility fixtures that are considered separate from flexible manufacturing system 106. Each of these multiple utility fixtures may be configured for use with flexible manufacturing system 106 and any number of other flexible manufacturing systems.

Additionally, the different couplings of mobile systems in plurality of mobile systems 134 may be performed autonomously in these illustrative examples. However, in other illustrative example, a coupling of one of plurality of mobile systems 134 to another one of plurality of mobile systems 134 may be performed manually in other illustrative examples.

Further, in other illustrative examples, one or more of plurality of mobile systems 134 may be drivable by, for example, without limitation, a human operator. For example, without limitation, in some cases, first tower 332 may be drivable with human guidance.

Figure 7:
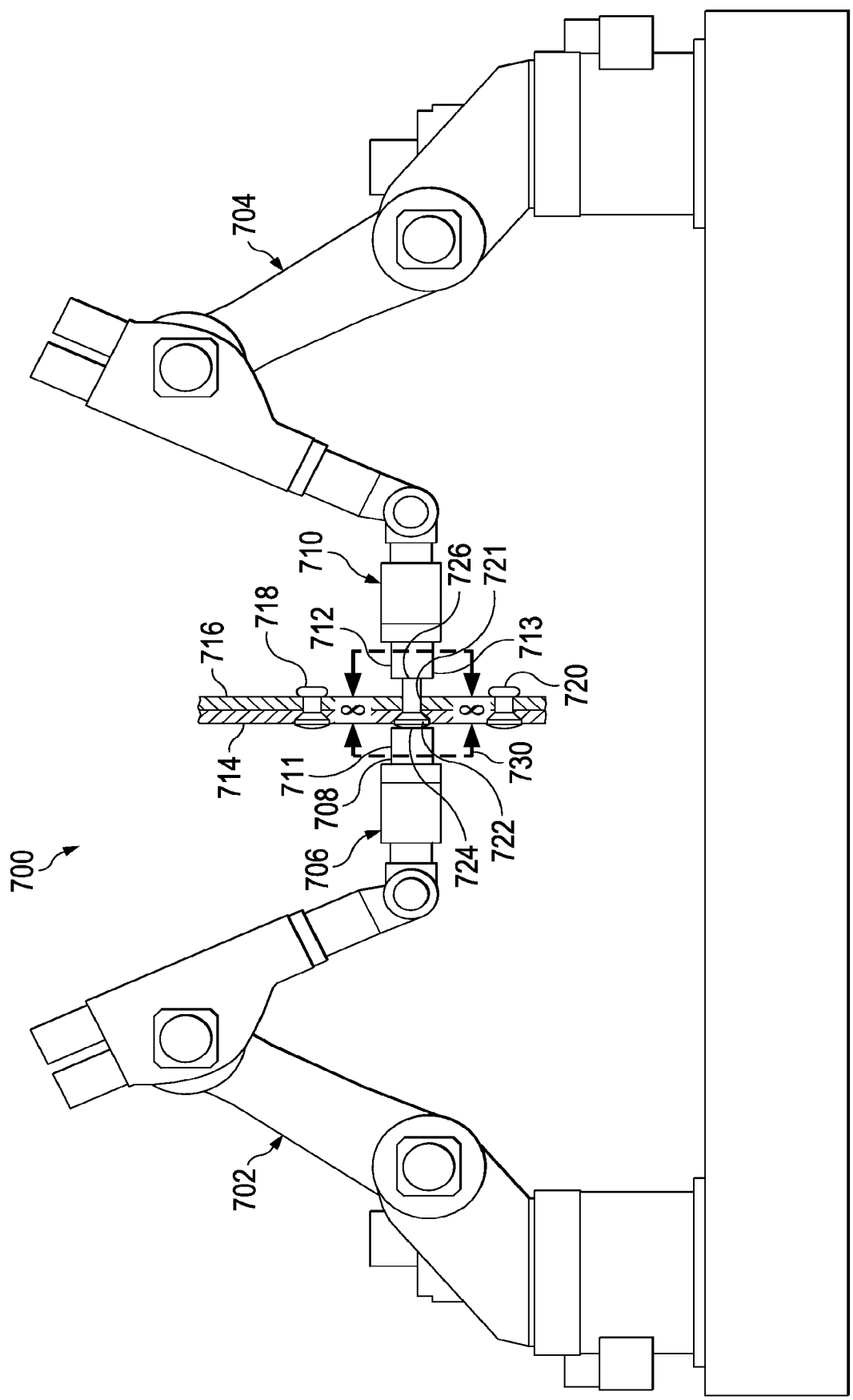
FIG. 7 is an illustration of a riveting environment in accordance with an illustrative embodiment.

With reference now to FIG. 7, an illustration of a riveting environment is depicted in accordance with an illustrative embodiment. In this illustrative example, riveting environment 700 may be an example of one implementation for riveting environment 600 in FIG. 6. First robotic device 702 may have end effector 706 with tool 708 and second robotic device 704 may have end effector 710 with tool 712.

First robotic device 702 and second robotic device 704 may be examples of first robotic device 602 and second robotic device 604, respectively, in FIG. 6. Further, end effector 706 and tool 708 may be examples of implementations for first end effector 614 and first riveting tool 616, respectively, in FIG. 6. End effector 710 and tool 712 may be examples of implementations for second end effector 620 and second riveting tool 622, respectively, in FIG. 6.

Tool 708 and tool 712 may take the form of hammer 711 and bucking bar 713, respectively. Hammer 711 and bucking bar 713 may be examples of implementations for hammer 618 and bucking bar 624, respectively, in FIG. 6.

Tool 708 and tool 712 may be used to form a rivet to join first part 714 and second part 716. In this illustrative example, rivet 718 and rivet 720 have already been installed.

As depicted, fastener 722 has been inserted through hole 721 that extends through first part 714 and second part 716. Fastener 722 may be an example of one implementation for fastener 626 in FIG. 6. Fastener 722 may have head 724 and end 726. Head 724 and end 726 may be examples of implementations for head 640 and second end 638, respectively, in FIG. 6. Section 730 may be shown enlarged in FIG. 8 below.

Figure 8:
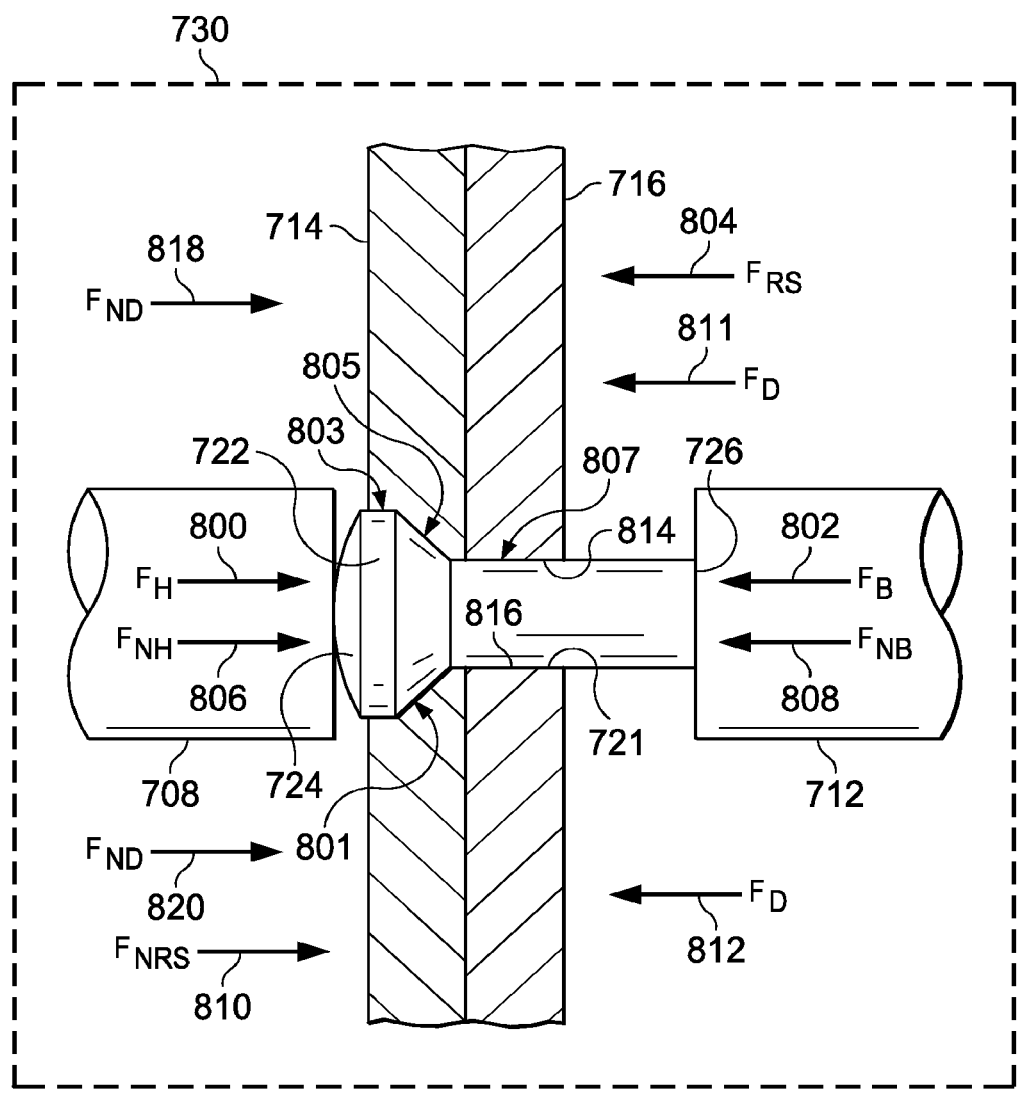
FIG. 8 is an illustration of an enlarged view of a section in accordance with an illustrative embodiment.

With reference now to FIG. 8, an illustration of an enlarged view of section 730 from FIG. 7 is depicted in accordance with an illustrative embodiment. As depicted, hole 721 may have counterbore portion 803, countersink portion 805, and elongated portion 807, which may be examples of implementations for counterbore portion 634, countersink portion 632, and elongated portion 630, respectively, in FIG. 6.

In this illustrative example, hammer force 800 may be applied to head 724 to create initial interference fit 801 between head 724 and countersink portion 805 of hole 721. Initial interference fit 801 may be an example of one implementation for initial interference fit 648 in FIG. 6.

Hammer force 800 may be applied to head 724 while bucking force 802 is applied to end 726. This application of hammer force 800 and bucking force 802 may constitute a first stage of riveting. Hammer force 800 and bucking force 802 may be examples of implementations for first force 644 and second force 646, respectively, in FIG. 6. Hammer force 800 may be greater than bucking force 802.

First part 714 and second part 716 may generate reactive structural force 804 in response to hammer force 800. Reactive structural force 804 may include deflection force 811 and deflection force 812. Deflection force 811 may be the force with which the portion of first part 714 and second part 716 at side 814 of fastener 722 deflects in response to hammer force 800. Deflection force 812 may be the force by which the portion of first part 714 and second part 716 at the other side 816 of fastener 722 deflects in response to hammer force 800. In this illustrative example, deflection force 811 and deflection force 812 may be substantially equal. In particular, deflection force 811 and deflection force 812 may both be equal to $F_D$. Of course, in other illustrative examples, deflection force 811 and deflection force 812 may not be equal.

A force equilibrium is created between hammer force 800, bucking force 802, and reactive structural force 804. In particular, hammer force 800, $F_H$, may be substantially equal to the sum of bucking force 802, $F_B$, and reactive structural force 804, $F_{RS}$, such that a force equilibrium is created. More specifically, hammer force 800 may be substantially equal to the sum of bucking force 802, deflection force 811, and deflection force 812 such that:

$$F_H = F_B + F_{RS} = F_B + 2F_D. \tag{1}$$

Next, at least one of hammer force 800 or bucking force 802 is adjusted such that new hammer force 806 and new bucking force 808 may be applied to fastener 722 to form a tail at end 726, shown as tail 902 in FIG. 9 below. This application of new hammer force 806 and new bucking force 808 may constitute a second stage of riveting. New hammer force 806 and new bucking force 808 may be examples of implementations for new first force 650 and new second force 652, respectively, in FIG. 6. New bucking force 808 may be greater than new hammer force 806.

New reactive structural force 810 may be generated by first part 714 and second part 716 in response to new bucking force 808. New reactive structural force 810 may include new deflection force 818 and new deflection force 820. New deflection force 818 may be the force with which the portion of first part 714 and second part 716 at side 814 of fastener 722 deflects in response to new bucking force 808. New deflection force 820 may be the force by which the portion of first part 714 and second part 716 at the other side 816 of fastener 722 deflects in response to new bucking force 808. In this illustrative example, new deflection force 818 and new deflection force 820 may be substantially equal. In particular, new deflection force 818 and new deflection force 820 may both be equal to $F_{ND}$. Of course, in other illustrative examples, new deflection force 818 and new deflection force 820 may not be equal.

In this illustrative example, a new force equilibrium is created between new hammer force 806, new bucking force 808, and new reactive structural force 810. In particular, new bucking force 808, $F_{NB}$, may be substantially equal to the sum of new hammer force 806, $F_{NH}$, and new reactive structural force 810, $F_{NRS}$, such that a new force equilibrium is created. More specifically, new bucking force 808 may be substantially equal to the sum of new hammer force 806, new deflection force 818, and new deflection force 820 such that:

$$F_{NB}=F_{NH}+F_{NRS}=F_{NH}+2F_{ND}. \qquad (2)$$

The application of new hammer force 806 and new bucking force 808 during second stage of riveting may create a final interference fit (not shown).

Figure 9:
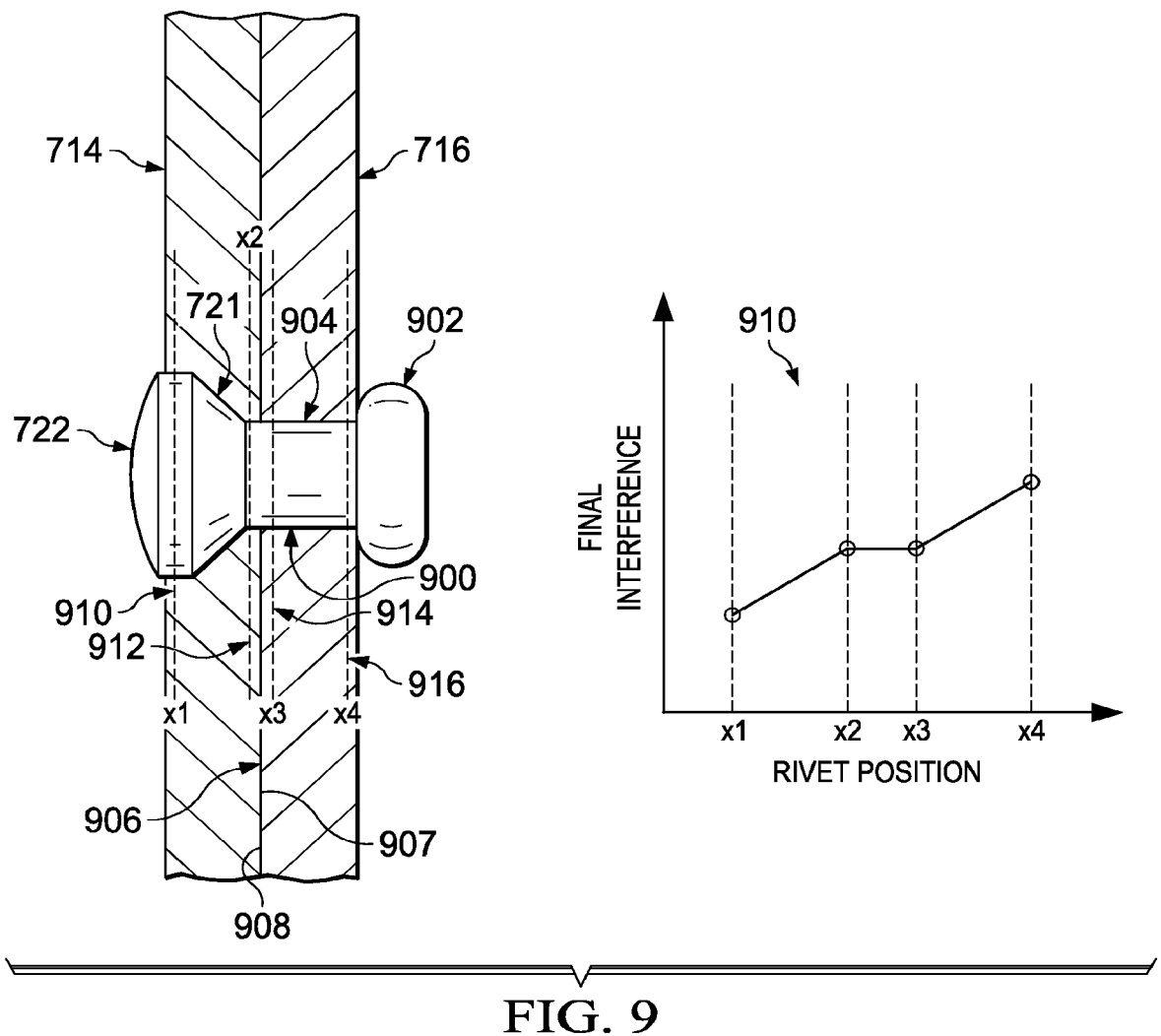
FIG. 9 is an illustration of a fully installed rivet and a chart of the final interference fit created between the rivet and a hole in accordance with an illustrative embodiment.

With reference now to FIG. 9, an illustration of a fully installed rivet and a chart of the final interference fit created between the rivet and hole 721 from FIG. 7 is depicted in accordance with an illustrative embodiment. In this illustrative example, rivet 900 has been fully formed and installed to join first part 714 and second part 716. As depicted, rivet 900 now has tail 902. The two-stage riveting process described in FIG. 8 for forming rivet 900 may produce rivet 900 having an improved quality.

In particular, the two-stage riveting process may result in final interference fit 904 being created between rivet 900 and hole 721. Final interference fit 904 may be an example of one implementation for final interference fit 653 in FIG. 6. Final interference fit 904 may be within selected tolerances. In this illustrative example, final interference fit 904 may be substantially uniform across interface 906. Interface 906 may be formed between first surface 907 and second surface 908.

Chart 910 illustrates final interference fit 904 created at various positions along rivet 900. As shown in chart 910, final interference fit 904 at position 912 located on one side of interface 906 near first surface 907 may be substantially equal to final interference fit 904 at position 914 located on the other side of interface 906 near second surface 908. In particular, final interference fit 904 may be substantially uniform across interface 906 between about position 912 and position 914.

Further, in this illustrative example, final interference fit 904 may be greater at position 914 near tail 902 of rivet 900 as compared to position 916 near head 724 of rivet 900. In this manner, rivet 900 may have final interference fit 904 of a desired quality that, while different along a length of rivet 900, may be substantially uniform across interface 906.

Figure 10:
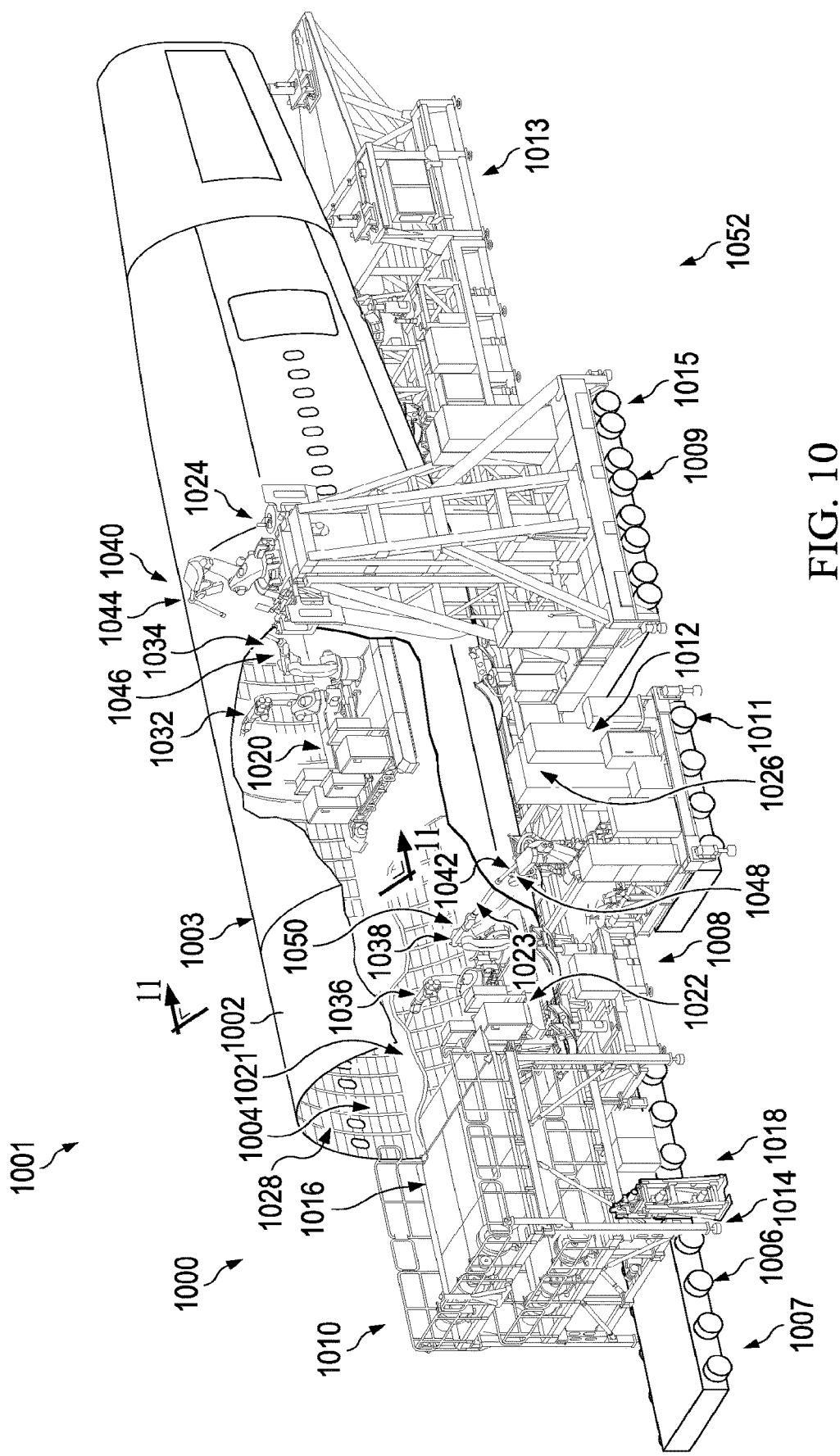
FIG. 10 is an illustration of an isometric cutaway view of a plurality of mobile platforms performing fastening processes within an interior of a fuselage assembly in a manufacturing environment in accordance with an illustrative embodiment.

With reference now to FIG. 10, an illustration of an isometric cutaway view of a plurality of mobile platforms performing fastening processes within an interior of a fuselage assembly in a manufacturing environment is depicted in accordance with an illustrative embodiment. In this illustrative example, manufacturing environment 1001 may be an example of one implementation for manufacturing environment 100 in FIG. 1.

As depicted, flexible manufacturing system 1000 may be present within manufacturing environment 1001. Flexible manufacturing system 1000 may be used to build fuselage assembly 1002. Flexible manufacturing system 1000 may be an example of one implementation for flexible manufacturing system 106 in FIG. 1. Fuselage assembly 1002 may be an example of one implementation for fuselage assembly 114 in FIG. 1.

In this illustrative example, fuselage assembly 1002 may be comprised of plurality of panels 1003 and plurality of members 1004. Plurality of panels 1003 and plurality of members 1004 may be examples of implementations for plurality of panels 120 and plurality of members 122 in FIGS. 1 and 2. Flexible manufacturing system 1000 may be used to join plurality of panels 1003 together, which may include joining members of plurality of members 1004 to each other, to panels of plurality of panels 1003, or both.

As depicted, flexible manufacturing system 1000 may include plurality of autonomous vehicles 1006, cradle system 1008, tower system 1010, autonomous tooling system 1012, and utility system 1014. Plurality of autonomous vehicles 1006, cradle system 1008, tower system 1010, autonomous tooling system 1012, and utility system 1014 may be examples of implementations for number of corresponding autonomous vehicles 316 in FIG. 3, cradle system 308 in FIG. 3, tower system 310 in FIG. 3, autonomous tooling system 312 in FIG. 3, and utility system 138 in FIG. 1, respectively.

As depicted, plurality of autonomous vehicles 1006 may include autonomous vehicle 1007, autonomous vehicle 1009, and autonomous vehicle 1011, as well as other autonomous vehicles (not shown). Autonomous vehicles 1007, 1009, and 1011 may have omnidirectional wheels. Plurality of autonomous vehicles 1006 have been used to move cradle system 1008, tower system 1010, and autonomous tooling system 1012 into selected positions relative to each other.

Cradle system 1008 may form assembly fixture 1013 for supporting fuselage assembly 1002 during the building of fuselage assembly 1002. Assembly fixture 1013 may be an example of one implementation for assembly fixture 324 in FIG. 3.

Tower system 1010 may include robotic tower 1016, which may be an example of one implementation for second tower 336 in FIG. 3. Autonomous vehicle 1007 is shown positioned under robotic tower 1016. Autonomous vehicle 1007 may be used to move robotic tower 1016 into a selected tower position relative to utility fixture 1018 of utility system 1014.

In this illustrative example, robotic tower 1016 may be coupled to utility fixture 1018 of utility system 1014. Cradle system 1008 may be coupled to robotic tower 1016. Further, autonomous tooling system 1012 may be coupled to cradle system 1008 and robotic tower 1016. In this manner, a number of utilities may be distributed downstream from utility fixture 1018 to robotic tower 1016, to cradle system 1008, and to autonomous tooling system 1012.

In this illustrative example, autonomous tooling system 1012 may include plurality of mobile platforms 1015. Plurality of mobile platforms 1015 may be used to perform fastening processes to join plurality of panels 1003 together. Plurality of panels 1003 may be joined to form at least one of lap joints, butt joints, or other types of joints. In this manner, plurality of panels 1003 may be joined such that at least one of circumferential attachment, longitudinal attachment, or some other type of attachment is created between the various panels of plurality of panels 1003.

As depicted, plurality of mobile platforms 1015 may include internal mobile platform 1020, internal mobile platform 1022, external mobile platform 1024, and external mobile platform 1026. Internal mobile platform 1020 and internal mobile platform 1022 may be performing operations within interior 1028 of fuselage assembly 1002, while external mobile platform 1024 and external mobile platform 1026 are performing assembly operations along the exterior of fuselage assembly 1002.

Internal mobile platform 1020 and internal mobile platform 1022 may be an example of one implementation for at least a portion of number of internal mobile platforms 402 in FIG. 4. External mobile platform 1024 and external mobile platform 1026 may be an example of one implementation for at least a portion of number of external mobile platforms 400 in FIG. 4.

Internal mobile platform 1020 may be configured to move along passenger floor 1021 while internal mobile platform 1022 may be configured to move along cargo floor 1023. Internal mobile platform 1020 and internal mobile platform 1022 may be coupled to robotic tower 1016 to receive the number of utilities through robotic tower 1016. External mobile platform 1024 and external mobile platform 1026 may be coupled to cradle system 1008 to receive the number of utilities from cradle system 1008.

As depicted, internal robotic device 1036 and internal robotic device 1038 may be associated with internal mobile platform 1022. Each of internal robotic device 1032, internal robotic device 1034, internal robotic device 1036, and internal robotic device 1038 may be an example of one implementation for internal robotic device 416 in FIG. 4.

External robotic device 1040 may be associated with external mobile platform 1024. External robotic device 1042 may be associated with external mobile platform 1026. Each of external robotic device 1040 and external robotic device 1042 may be an example of one implementation for external robotic device 408 in FIG. 4.

As depicted, external robotic device 1040 and internal robotic device 1034 may work collaboratively to install fasteners, such as fastener 626 in FIG. 6, autonomously in fuselage assembly 1002. Similarly, external robotic device 1042 and internal robotic device 1038 may work collaboratively to install fasteners, such as fastener 626 in FIG. 6, autonomously in fuselage assembly 1002.

In this illustrative example, end effector 1044 of external robotic device 1040 and end effector 1046 of internal robotic device 1034 may be positioned relative to a same location on fuselage assembly 1002 to perform a fastening process, such as fastening process 424 in FIG. 4, at this location. In this illustrative example, the fastening process may include a two-stage riveting process, such as two-stage riveting process 444 described in FIGS. 4 and 6. Similarly, end effector 1048 of external robotic device 1042 and end effector 1050 of internal robotic device 1038 may be positioned relative to a same location on fuselage assembly 1002 to perform a fastening process, which may include a two-stage riveting process, at the location.

In this illustrative example, autonomous vehicle 1009 may be fixedly associated with external mobile platform 1024. Autonomous vehicle 1009 may be used to drive external mobile platform 1024 autonomously. For example, autonomous vehicle 1009 may be used to autonomously drive external mobile platform 1024 across floor 1052 of manufacturing environment 1001 relative to assembly fixture 1013.

Similarly, autonomous vehicle 1011 may be fixedly associated with external mobile platform 1026. Autonomous vehicle 1011 may be used to drive external mobile platform 1026 autonomously. For example, autonomous vehicle 1011 may be used to autonomously drive external mobile platform 1026 across floor 1052 of manufacturing environment 1001 relative to assembly fixture 1013.

By being fixedly associated with external mobile platform 1024 and external mobile platform 1026, autonomous vehicle 1009 and autonomous vehicle 1011 may be considered integral to external mobile platform 1024 and external mobile platform 1026, respectively. However, in other illustrative examples, these autonomous vehicles may be independent of the external mobile platforms in other illustrative examples.

In these illustrative examples, a metrology system (not shown) may be used to help position internal mobile platform 1020, internal mobile platform 1022, external mobile platform 1024, and external mobile platform 1026 relative to fuselage assembly 1002. In particular, the metrology system (not shown) may be used to precisely position internal robotic device 1032 of internal mobile platform 1020, internal robotic device 1034 of internal mobile platform 1020, internal robotic device 1036 of internal mobile platform 1022, internal robotic device 1038 of internal mobile platform 1022, external robotic device 1040 of external mobile platform 1024, and external robotic device 1042 of external mobile platform 1026. In particular, these robotic devices may be precisely positioned relative to each other and to fuselage assembly 1002.

Figure 11:
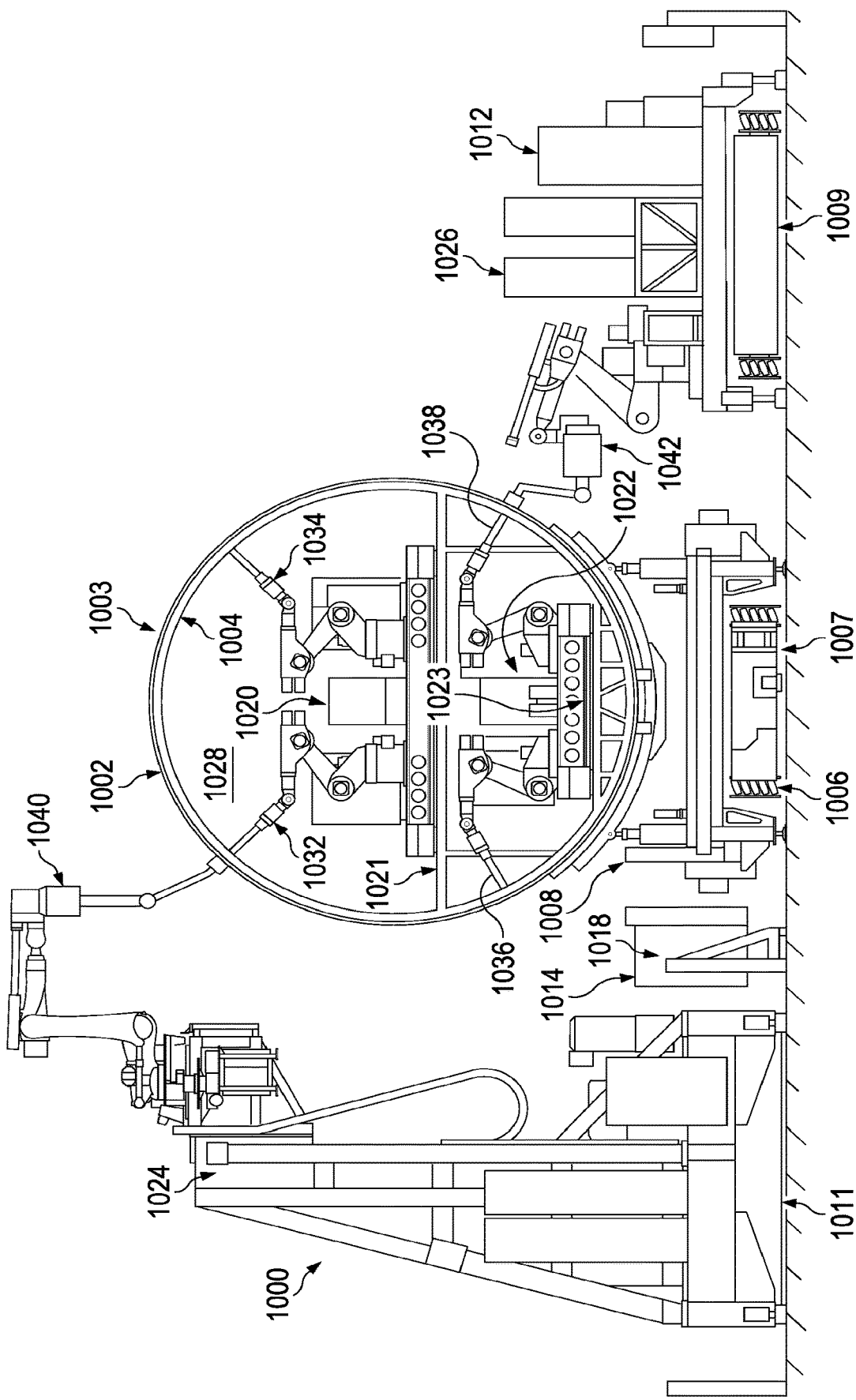
FIG. 11 is an illustration of a cross-sectional view of a flexible manufacturing system and a fuselage assembly in accordance with an illustrative embodiment.

With reference now to FIG. 11, an illustration of a cross-sectional view of flexible manufacturing system 1000 and fuselage assembly 1002 from FIG. 10 is depicted in accordance with an illustrative embodiment. In this illustrative example, a cross-sectional view of flexible manufacturing system 1000 and fuselage assembly 1002 from FIG. 10 is depicted taken in the direction of lines 11-11 in FIG. 10. As depicted, internal mobile platform 1020 may move along passenger floor 1021 within interior 1028 of fuselage assembly 1002, while internal mobile platform 1022 may move along cargo floor 1023 of fuselage assembly 1002.

A metrology system (not shown) may be used to precisely position the various robotic devices associated with autonomous tooling system 1012 relative to each other and to fuselage assembly 1002 such that fasteners may be installed in fuselage assembly 1002. In one illustrative example, rivets may be installed using a two-stage riveting process, such as two-stage riveting process 444 in FIG. 4. For example, without limitation, internal robotic device 1032 associated with internal mobile platform 1020 and external robotic device 1040 associated with external mobile platform 1024 may be positioned relative to a same location on fuselage assembly 1002 to perform the two-stage riveting process.

The illustrations in FIGS. 7-11 are not meant to imply physical or architectural limitations to the manner in which an illustrative embodiment may be implemented. Other components in addition to or in place of the ones illustrated may be used. Some components may be optional.

The different components shown in FIGS. 7-11 may be illustrative examples of how components shown in block form in FIGS. 1-6 can be implemented as physical structures. Additionally, some of the components in FIGS. 7-11 may be combined with components in FIG. 1-6, used with components in FIG. 1-6, or a combination of the two.

Figure 12:
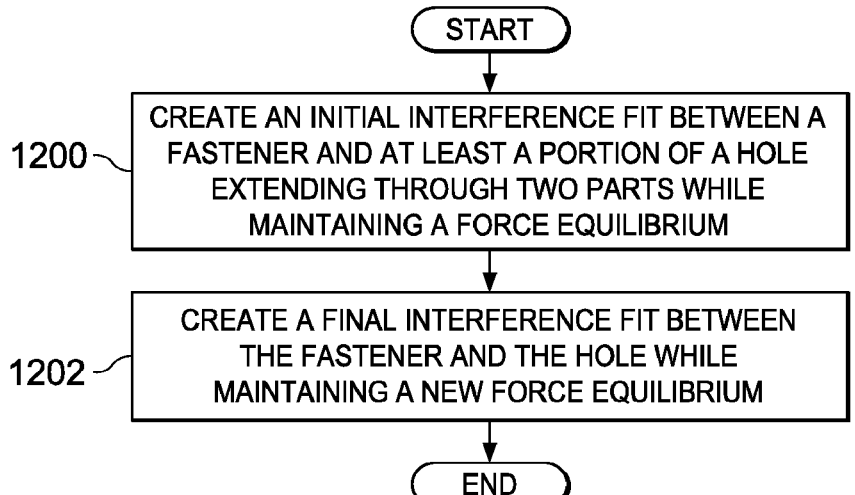
FIG. 12 is an illustration of a process for fastening two parts together in the form of a flowchart in accordance with an illustrative embodiment.

Turning now to FIG. 12, an illustration of a process for fastening two parts together is depicted in the form of a flowchart in accordance with an illustrative embodiment. The process illustrated in FIG. 12 may be implemented using flexible manufacturing system 106 in FIG. 1. In particular, the process illustrated in FIG. 12 may be used to fasten first part 606 and second part 608 in riveting environment 600 in FIG. 6.

The process may begin by creating initial interference fit 648 between fastener 626 and at least a portion of hole 628 extending through two parts 603 while maintaining force equilibrium 641 (operation 1200). In operation 1200, force equilibrium 641 may be between first force 644 being applied to first end 636 of fastener 626, second force 646 that is less than first force 644 being applied to second end 638 of fastener 626, and reactive structural force 645. First end 636 of fastener 626 may take the form of head 640. Further, in operation 1200, two parts 603 may include, for example, first part 606 and second part 608.

Next, final interference fit 653 may be created between fastener 626 and hole 628 while maintaining new force equilibrium 647 (operation 1202), with the process terminating thereafter. Operation 1202 may be performed by forming tail 642 at second end 638 of fastener 626 while maintaining new force equilibrium 647 to fully install rivet 605. New force equilibrium 647 may be between new first force 650 being applied to head 640, new second force 652 being applied to the end, and new reactive structural force 654. Forming tail 642 at second end 638 of fastener 626 in operation 1202 may complete the fastener installation and thereby, complete the joining of two parts 603 together at the particular location at which fastener 626 is installed. The process described in FIG. 12 may be repeated any number of times at any number of locations to install any number of rivets.

Figure 13:
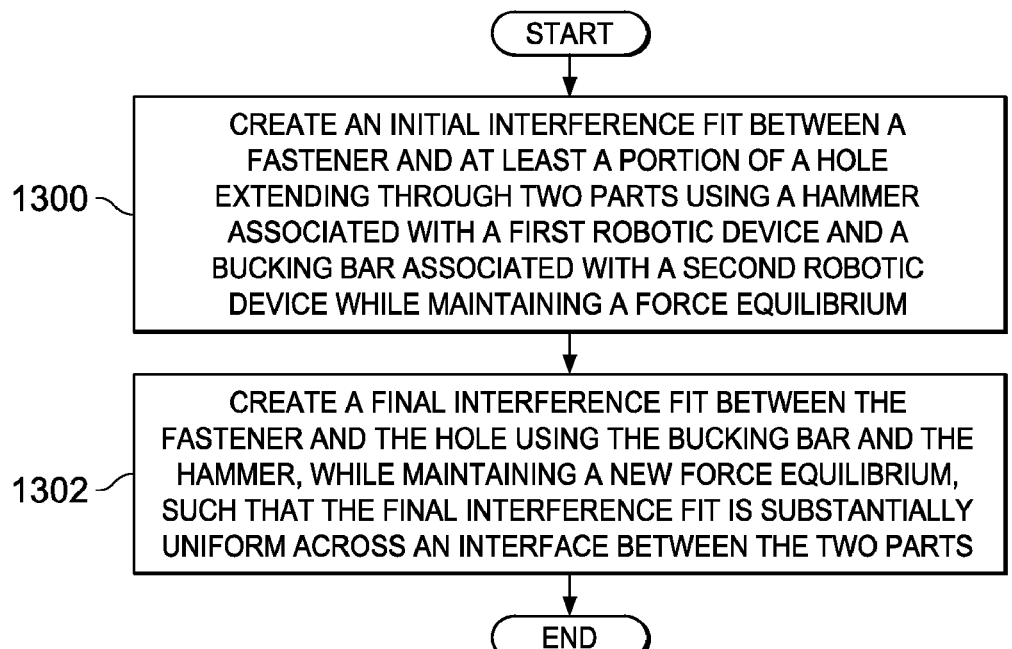
FIG. 13 is an illustration of a process for performing a two-stage riveting process in the form of a flowchart in accordance with an illustrative embodiment.

Turning now to FIG. 13, an illustration of a process for performing a two-stage riveting process is depicted in the form of a flowchart in accordance with an illustrative embodiment. The process illustrated in FIG. 13 may be implemented using flexible manufacturing system 106 in FIG. 1. In particular, the process illustrated in FIG. 13 may be used to perform two-stage riveting process 444 in FIGS. 4 and 6 to fasten first part 606 and second part 608 in riveting environment 600 in FIG. 6.

The process may begin by creating initial interference fit 648 between fastener 626 and at least a portion of hole 628 extending through two parts 603 using hammer 618 associated with first robotic device 602 and bucking bar 624 associated with second robotic device 604 while maintaining force equilibrium 641 (operation 1300). Force equilibrium 641 may be between first force 644 being applied to head 640 at first end 636 of fastener 626, second force 646 being applied to second end 638 of fastener 626 that is less than first force 644, and reactive structural force 645.

Next, final interference fit 653 may be created between fastener 626 and hole 628 using bucking bar 624 and hammer 618, while maintaining new force equilibrium 647, such that final interference fit 653 is substantially uniform across interface 613 between two parts 603 (operation 1302), with the process terminating thereafter. In other words, final interference fit 653 at a first side of interface 613 between two parts 603 may be equal to final interference fit 653 at a second side of interface 613 within selected tolerances. New force equilibrium 647 may be between new first force 650 being applied to head 640, new second force 652 being applied to second end 638, and new reactive structural force 654. In operation 1302, tail 642 may be formed at second end 638 of fastener 626 to substantially complete installation of rivet 605.

Forming tail 642 at second end 638 of fastener 626 in operation 1302 may complete the installation of rivet 605 that joins two parts 603 together at the location of rivet 605. With final interference fit 653 being substantially uniform across interface 613, rivet 605 may be considered as being of a desired or sufficiently high quality.

Figure 14:
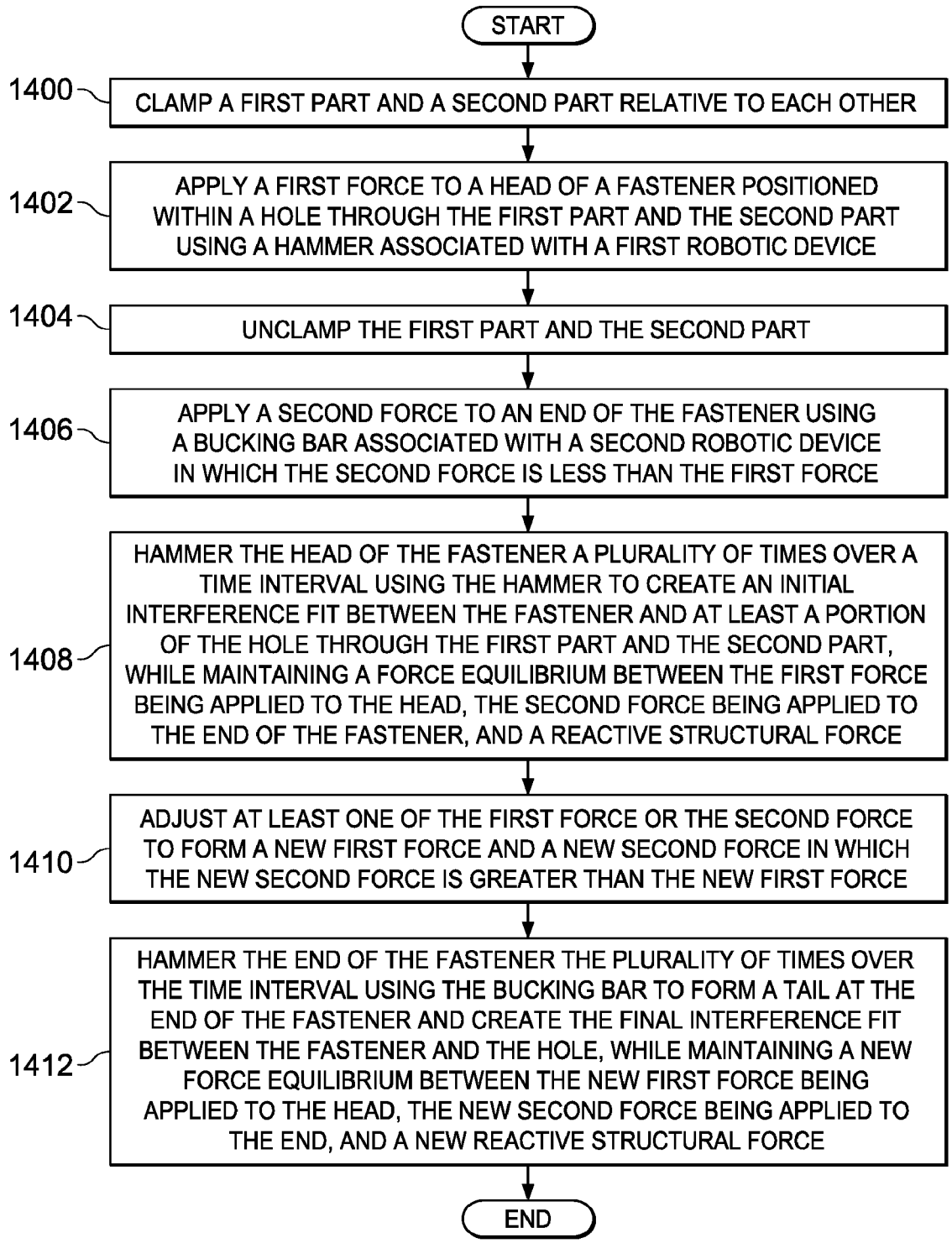
FIG. 14 is an illustration of a process for performing a two-stage riveting process in the form of a flowchart in accordance with an illustrative embodiment.

Turning now to FIG. 14, an illustration of a process for performing a two-stage riveting process is depicted in the form of a flowchart in accordance with an illustrative embodiment. The process illustrated in FIG. 14 may be implemented using flexible manufacturing system 106 in FIG. 1. In particular, the process illustrated in FIG. 14 may be used to perform two-stage riveting process 444 in FIG. 4 to fasten first part 606 and second part 608 in riveting environment 600 in FIG. 6.

The process begins by clamping first part 606 and second part 608 relative to each other (operation 1400). In operation 1400, first part 606 and second part 608 may be clamped together using first clamping device 660 and second clamping device 662. First clamping device 660 may apply a first clamping force to first surface 623 of first part 606 and second clamping device 662 may apply a second clamping force substantially equal to the first clamping force to second surface 625 of second part 608 to clamp these parts together.

Next, first force 644 is applied to head 640 of fastener 626 positioned within hole 628 through first part 606 and second part 608 using hammer 618 associated with first robotic device 602 (operation 1402). Thereafter, first part 606 and second part 608 are unclamped (operation 1404). Second force 646 is then applied to an end of fastener 626 using bucking bar 624 associated with second robotic device 604 in which second force 646 is less than first force 644 (operation 1406).

Head 640 of fastener 626 is then hammered a plurality of times over a time interval using hammer 618 to create initial interference fit 648 between fastener 626 and at least a portion of hole 628 through first part 606 and second part 608, while maintaining force equilibrium 641 between first force 644 being applied to head 640, second force 646 being applied to the end of fastener 626, and reactive structural force 645 (operation 1408). Next, at least one of first force 644 or second force 646 is adjusted to form new first force 650 and new second force 652 in which new second force 652 is greater than new first force 650 (operation 1410).

The end of fastener 626 is then hammered the plurality of times over the time interval using bucking bar 624 to form tail 642 at the end of fastener 626 and create final interference fit 653 between fastener 626 and hole 628, while maintaining new force equilibrium 647 between new first force 650 being applied to head 640, new second force 652 being applied to the end, and new reactive structural force 654 (operation 1412), with the process terminating thereafter. Once operation 1412 has been performed, rivet 605 may be considered fully formed and installed and first part 606 and second part 608 may be considered fastened. Rivet 605 may have a desired quality such that final interference fit 653 created between fastener 626 and hole 628 may be within selected tolerances. In one illustrative example, final interference fit 653 may be substantially uniform across interface 613 between first part 606 and second part 608.

Figure 15:
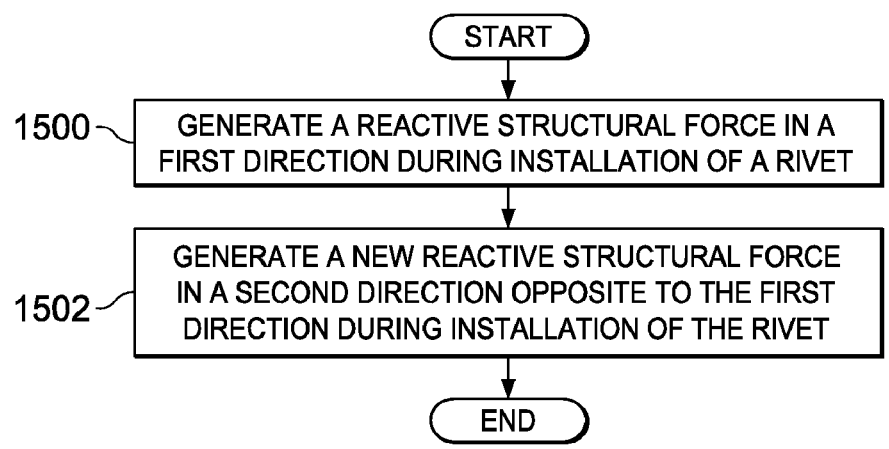
FIG. 15 is an illustration of a process for installing a rivet in the form of a flowchart in accordance with an illustrative embodiment.

Turning now to FIG. 15, an illustration of a process for installing a rivet is depicted in the form of a flowchart in accordance with an illustrative embodiment. The process illustrated in FIG. 15 may be implemented to install a rivet, such as rivet 605 in FIG. 6.

The process may begin by generating reactive structural force 645 in a first direction during installation of rivet 605 (operation 1500). New reactive structural force 654 may then be generated in a second direction opposite to the first direction during the installation of rivet 605 (operation 1502), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 16:
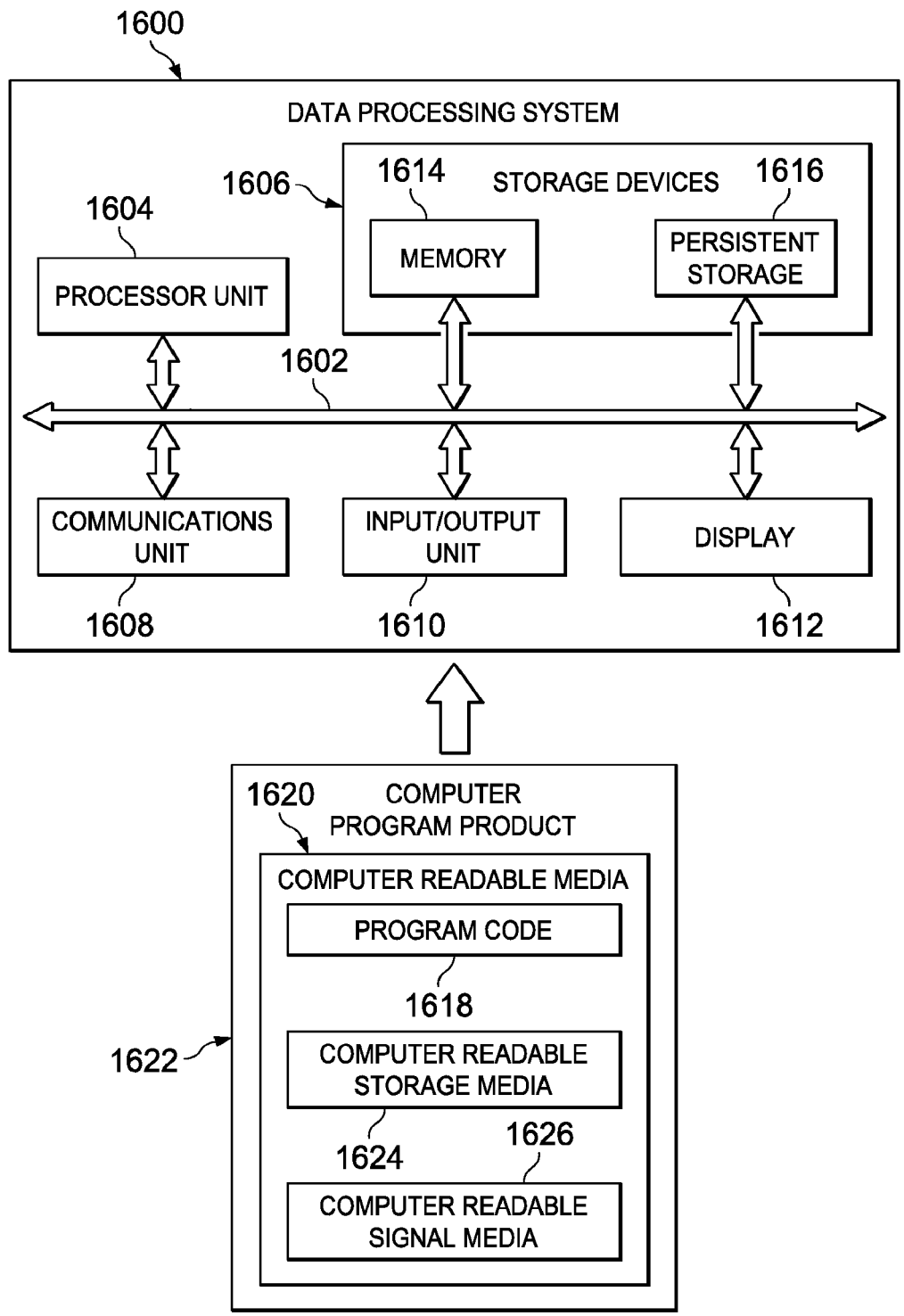
FIG. 16 is an illustration of a data processing system in the form of a block diagram in accordance with an illustrative embodiment.

Turning now to FIG. 16, an illustration of a data processing system is depicted in the form of a block diagram in accordance with an illustrative embodiment. Data processing system 1600 may be used to implement any of the controllers described above, including control system 136 in FIG. 1. For example, data processing system 1600 may be used to implement one or more of set of controllers 140 in FIG. 1.

As depicted, data processing system 1600 includes communications framework 1602, which provides communications between processor unit 1604, storage devices 1606, communications unit 1608, input/output unit 1610, and display 1612. In some cases, communications framework 1602 may be implemented as a bus system.

Processor unit 1604 is configured to execute instructions for software to perform a number of operations. Processor unit 1604 may comprise at least one of a number of processors, a multi-processor core, or some other type of processor, depending on the implementation. In some cases, processor unit 1604 may take the form of a hardware unit, such as a circuit system, an application specific integrated circuit (ASIC), a programmable logic device, or some other suitable type of hardware unit.

Instructions for the operating system, applications and programs run by processor unit 1604 may be located in storage devices 1606. Storage devices 1606 may be in communication with processor unit 1604 through communications framework 1602. As used herein, a storage device, also referred to as a computer readable storage device, is any piece of hardware capable of storing information on a temporary basis, a permanent basis, or both. This information may include, but is not limited to, data, program code, other information, or some combination thereof.

Memory 1614 and persistent storage 1616 are examples of storage devices 1606. Memory 1614 may take the form of, for example, a random access memory or some type of volatile or non-volatile storage device. Persistent storage 1616 may comprise any number of components or devices. For example, persistent storage 1616 may comprise a hard drive, a flash memory, a rewritable optical disk, a rewritable magnetic tape, or some combination of the above. The media used by persistent storage 1616 may or may not be removable.

Communications unit 1608 allows data processing system 1600 to communicate with other data processing systems, devices, or both. Communications unit 1608 may provide communications using physical communications links, wireless communications links, or both.

Input/output unit 1610 allows input to be received from and output to be sent to other devices connected to data processing system 1600. For example, input/output unit 1610 may allow user input to be received through a keyboard, a mouse, some other type of input device, or a combination thereof. As another example, input/output unit 1610 may allow output to be sent to a printer connected to data processing system 1600. Display 1612 is configured to display information to a user. Display 1612 may comprise, for example, without limitation, a monitor, a touch screen, a laser display, a holographic display, a virtual display device, some other type of display device, or a combination thereof.

In this illustrative example, the processes of the different illustrative embodiments may be performed by processor unit 1604 using computer-implemented instructions. These instructions may be referred to as program code, computer usable program code, or computer readable program code and may be read and executed by one or more processors in processor unit 1604.

In these examples, program code 1618 is located in a functional form on computer readable media 1620, which is selectively removable, and may be loaded onto or transferred to data processing system 1600 for execution by processor unit 1604. Program code 1618 and computer readable media 1620 together form computer program product 1622. In this illustrative example, computer readable media 1620 may be computer readable storage media 1624 or computer readable signal media 1626.

Computer readable storage media 1624 is a physical or tangible storage device used to store program code 1618 rather than a medium that propagates or transmits program code 1618. Computer readable storage media 1624 may be, for example, without limitation, an optical or magnetic disk or a persistent storage device that is connected to data processing system 1600.

Alternatively, program code 1618 may be transferred to data processing system 1600 using computer readable signal media 1626. Computer readable signal media 1626 may be, for example, a propagated data signal containing program code 1618. This data signal may be an electromagnetic signal, an optical signal, or some other type of signal that can be transmitted over physical communications links, wireless communications links, or both.

The illustration of data processing system 1600 in FIG. 16 is not meant to provide architectural limitations to the manner in which the illustrative embodiments may be implemented. The different illustrative embodiments may be implemented in a data processing system that includes components in addition to or in place of those illustrated for data processing system 1600. Further, components shown in FIG. 16 may be varied from the illustrative examples shown.

Figure 17:
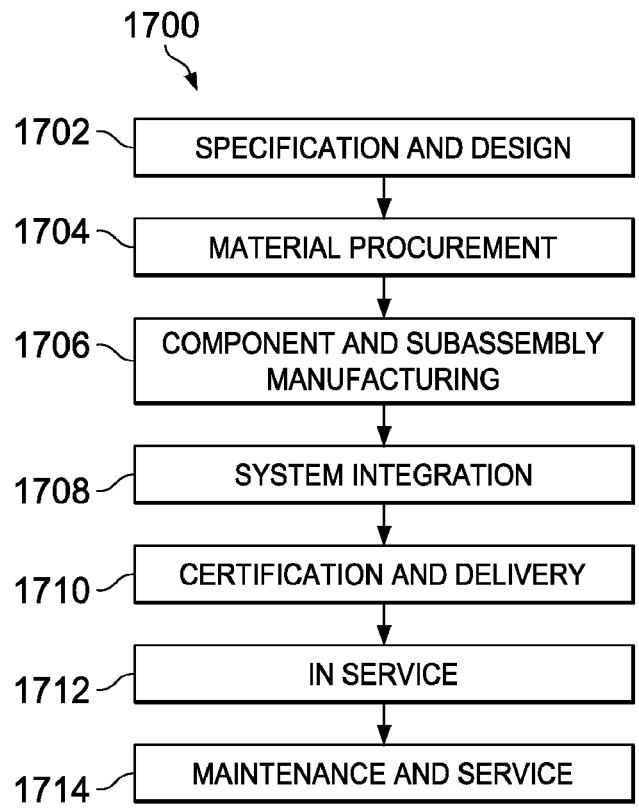
FIG. 17 is an illustration of an aircraft manufacturing and service method in the form of a block diagram in accordance with an illustrative embodiment.
Figure 18:
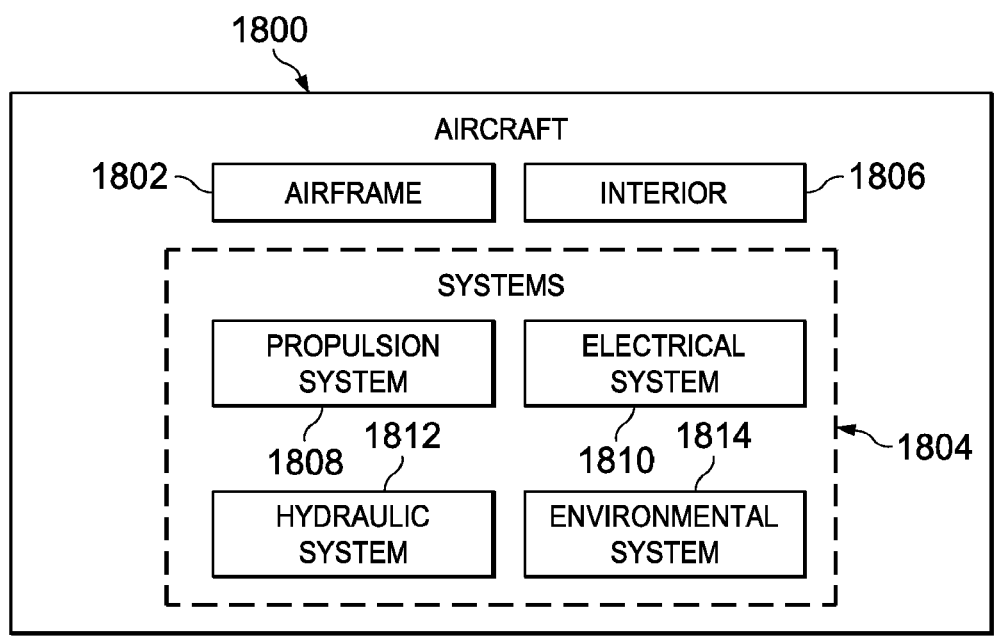
FIG. 18 is an illustration of an aircraft in the form of a block diagram in which an illustrative embodiment may be implemented.

The illustrative embodiments of the disclosure may be described in the context of aircraft manufacturing and service method 1700 as shown in FIG. 17 and aircraft 1800 as shown in FIG. 18. Turning first to FIG. 17, an illustration of an aircraft manufacturing and service method is depicted in the form of a block diagram in accordance with an illustrative embodiment. During pre-production, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 takes place. Thereafter, aircraft 1800 in FIG. 18 may go through certification and delivery 1710 in order to be placed in service 1712. While in service 1712 by a customer, aircraft 1800 in FIG. 18 is scheduled for routine maintenance and service 1714, which may include modification, reconfiguration, refurbishment, and other maintenance or service.

Each of the processes of aircraft manufacturing and service method 1700 may be performed or carried out by at least one of a system integrator, a third party, or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of an aircraft is depicted in the form of a block diagram in which an illustrative embodiment may be implemented. In this example, aircraft 1800 is produced by aircraft manufacturing and service method 1700 in FIG. 17 and may include airframe 1802 with plurality of systems 1804 and interior 1806. Examples of systems 1804 include one or more of propulsion system 1808, electrical system 1810, hydraulic system 1812, and environmental system 1814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700 in FIG. 17. In particular, flexible manufacturing system 106 from FIG. 1 may be used to manufacture the fuselage of aircraft 1800 during any one of the stages of aircraft manufacturing and service method 1700. For example, without limitation, flexible manufacturing system 106 from FIG. 1 may be used during at least one of component and subassembly manufacturing 1706, system integration 1708, or some other stage of aircraft manufacturing and service method 1700. In particular, two-stage riveting process 444 in FIG. 4 may be used to install rivets in fuselage panels, such as plurality of panels 120 in FIG. 1, to build, for example, without limitation, fuselage assembly 114 in FIG. 1, for airframe 1802 of aircraft 1800.

In one illustrative example, components or subassemblies produced in component and subassembly manufacturing 1706 in FIG. 17 may be fabricated or manufactured in a manner similar to components or subassemblies produced while aircraft 1800 is in service 1712 in FIG. 17. As yet another example, one or more apparatus embodiments, method embodiments, or a combination thereof may be utilized during production stages, such as component and subassembly manufacturing 1706 and system integration 1708 in FIG. 17. One or more apparatus embodiments, method embodiments, or a combination thereof may be utilized while aircraft 1800 is in service 1712, during maintenance and service 1714 in FIG. 17, or both. The use of a number of the different illustrative embodiments may substantially expedite the assembly of and reduce the cost of aircraft 1800.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for installing a fastener, the method comprising:
   generating a reactive structural force in a first direction during installation of the fastener by a first robotic device having a first tool and a second robotic device having a second tool, wherein a number of controllers control the first robotic device and the second robotic device to generate the reactive structural force in the first direction; and
   generating a new reactive structural force in a second direction opposite to the first direction during the installation of the fastener by the first robotic device having the first tool and the second robotic device having the second tool, wherein the number of controllers control the first robotic device and the second robotic device to generate the new reactive structural force in the second direction, wherein generating the new reactive structural force comprises:
   generating the new reactive structural force substantially equal to a difference between a new first force being applied to a head of the fastener in a hole extending through two parts and a new second force being applied to an end of the fastener.

2. The method of claim 1, wherein generating the reactive structural force comprises:
   generating the reactive structural force substantially equal to a difference between a first force being applied to the head of the fastener in the hole extending through the two parts and a second force that is applied to the end of the fastener.

3. The method of claim 1, wherein generating the reactive structural force comprises:
   applying a first force to the head of the fastener in the hole extending through the two parts; and
   applying a second force that is less than the first force to the end of the fastener; and
   compensating for a force differential between the first force and the second force using the reactive structural force to maintain a force equilibrium.

4. The method of claim 3, wherein generating the new reactive structural force comprises:
   applying the new first force to the head of the fastener; and
   applying the new second force that is greater than the new first force to the end of the fastener; and
   compensating for a new force differential between the new first force and the new second force using the new reactive structural force to maintain a new force equilibrium.

5. The method of claim 1, wherein the fastener is a rivet.

6. An apparatus comprising:
   a first robotic device having a first tool;
   a second robotic device having a second tool; and
   a number of controllers that control the first robotic device and the second robotic device to perform a two-stage process for installing a fastener, comprising:
   generating a reactive structural force in a first direction during installation of the fastener by the first robotic device having the first tool and the second robotic device having the second tool, wherein the number of controllers control the first robotic device and the second robotic device to generate the reactive structural force in the first direction, and
   generating a new reactive structural force in a second direction opposite to the first direction during the installation of the fastener by the first robotic device having the first tool and the second robotic device having the second tool, wherein the number of controllers control the first robotic device and the second robotic device to generate the new reactive structural force in the second direction, wherein generating the new reactive structural force comprises generating the new reactive structural force substantially equal to a difference between a new first force being applied to a head of the fastener in a hole extending through two parts and a new second force being applied to an end of the fastener.

7. The apparatus of claim 6, wherein the two-stage process for installing the fastener is a two-stage riveting process.

8. The apparatus of claim 7, wherein the first tool is a first riveting tool associated with the first robotic device and the second tool is a second riveting tool associated with the second robotic device.

9. The apparatus of claim 8, wherein the first riveting tool is a hammer and the second riveting tool is a bucking bar.

10. The apparatus of claim 6, wherein the number of controllers comprises:
a first controller that controls the first robotic device; and
a second controller that controls the second robotic device.

11. The apparatus of claim 6, wherein the number of controllers is associated with at least one of the first robotic device or the second robotic device.

12. The apparatus of claim 6, wherein the number of controllers control the first robotic device and the second robotic device to maintain a force equilibrium during a first stage of the two-stage process for installing the fastener and a new force equilibrium during a second stage of the two-stage process for installing the fastener.

13. The apparatus of claim 6 further comprising:
an external mobile platform, wherein the first robotic device is an external robotic device associated with the external mobile platform.

14. The apparatus of claim 6 further comprising:
an internal mobile platform, wherein the second robotic device is an internal robotic device associated with the internal mobile platform.

15. The apparatus of claim 6 further comprising:
a first clamping device associated with the first robotic device; and
a second clamping device associated with the second robotic device.

16. The apparatus of claim 15, wherein the first clamping device and the second clamping device are used to clamp a first part and a second part together prior to a first force being applied to a first end of the fastener and wherein the first part and the second part are unclamped prior to a second force being applied to a second end of the fastener.

17. An apparatus comprising:
a plurality of parts;
a hole extending through the plurality of parts;
a partially formed fastener having an interference fit with at least a portion of the hole;
a first robotic device having a first tool;
a second robotic device having a second tool; and
a number of controllers that control the first robotic device and the second robotic device to perform a two-stage process for installing the partially formed fastener, comprising:
generating a reactive structural force in a first direction during installation of the fastener by the first robotic device having the first tool and the second robotic device having the second tool, wherein the number of controllers control the first robotic device and the second robotic device to generate the reactive structural force in the first direction, wherein generating the reactive structural force comprises: applying a first force to a head of the fastener in the hole extending through the plurality of parts, applying a second force that is less than the first force to an end of the fastener, and compensating for a force differential between the first force and the second force using the reactive structural force to maintain a force equilibrium, and
generating a new reactive structural force in a second direction opposite to the first direction during the installation of the fastener by the first robotic device having the first tool and the second robotic device having the second tool, wherein the number of controllers control the first robotic device and the second robotic device to generate the new reactive structural force in the second direction, wherein generating the new reactive structural force comprises: applying a new first force to the head of the fastener, applying a new second force that is greater than the new first force to the end of the fastener, and compensating for a new force differential between the new first force and the new second force using the new reactive structural force to maintain a new force equilibrium.

18. The apparatus of claim 17, wherein the partially formed fastener has the interference fit with at least one of a countersink portion of the hole, a counterbore portion of the hole, or at least a portion of an elongated portion of the hole.

19. The apparatus of claim 17, wherein the partially formed fastener is a partially formed rivet.

20. The apparatus of claim 17 further comprising:
a first clamping device associated with the first robotic device; and
a second clamping device associated with the second robotic device.

* * * * *